United States Patent
Furuta et al.

(10) Patent No.: US 6,538,224 B2
(45) Date of Patent: Mar. 25, 2003

(54) HYBRID TYPE GAS INSULATION SWITCH GEAR APPARATUS

(75) Inventors: Hiroshi Furuta, Yokohama (JP); Kozo Matsushita, Chigasaki (JP); Hiroshi Murase, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/918,536

(22) Filed: Aug. 1, 2001

(65) Prior Publication Data

US 2002/0056704 A1 May 16, 2002

(30) Foreign Application Priority Data

Aug. 2, 2000 (JP) ......................................... 2000-234920

(51) Int. Cl.[7] .............................................. H01H 33/18
(52) U.S. Cl. .............................. 218/43; 218/79; 218/80; 218/154; 218/155
(58) Field of Search ............................... 218/7, 14, 78, 218/2, 79, 80, 84, 3, 43–45, 48, 70, 154–155

(56) References Cited

U.S. PATENT DOCUMENTS

| | | | | |
|---|---|---|---|---|
| 3,745,284 A | * | 7/1973 | Hosokawa | .................. 218/154 |
| 4,297,553 A | | 10/1981 | Kawaguchi et al. | |
| 4,440,996 A | | 4/1984 | Calvino | |
| 4,810,840 A | * | 3/1989 | Okuno | ........................ 218/154 |
| 5,796,060 A | * | 8/1998 | Füchsle et al. | ............... 218/79 |
| 6,127,641 A | * | 10/2000 | Meinherz | ..................... 218/43 |

FOREIGN PATENT DOCUMENTS

| | | |
|---|---|---|
| DE | 1197532 | 7/1965 |
| EP | 744758 A2 | 11/1996 |

* cited by examiner

Primary Examiner—Lincoln Donovan
(74) Attorney, Agent, or Firm—Oblon, Spivak, McClelland, Maier & Neustadt, P.C.

(57) ABSTRACT

In a hybrid type gas insulation switch gear apparatus, a main enclosure including a first cylindrical section have a base and a second cylindrical section branched from the base. A bushing is mounted on the cylindrical section and including a hollow insulating housing having a housing space and a central conductor extended in the hollow insulating housing. A first insulating spacer is provided in the first cylindrical section and configured to separate the first hollow space into first and second segment spaces. An insulating enclosure is also mounted to the second cylindrical section and including an enclosure space. A second insulating spacer is provided between the insulating enclosure and the second cylindrical section and configured to separate the enclosure space from the second hollow space. A disconnecting switch is formed in the first segment space of the first cylindrical section and a circuit breaker is also formed in the insulating enclosure.

6 Claims, 20 Drawing Sheets

HYBRID TYPE GAS INSULATION SWITCH GEAR APPARATUS

CROSS-REFERENCE TO RELATED APPLICATIONS

This application is based upon and claims the benefit of priority from the prior Japanese Patent Application No. 2000-234920, filed Aug. 2, 2000, the entire contents of which are incorporated herein by reference.

BACKGROUND OF THE INVENTION

1. Field of the Invention

The present invention relates to a hybrid type gas insulation switch gear apparatus installed in an electrical building such as a substation and, particularly to a hybrid type gas insulation switch gear apparatus having an improved arrangement of various equipments such as the circuit breaker.

2. Description of the Related Art

In general, the bus and the iron tower in an air substation have a long life and, thus, are less likely to be renewed in replacing the switch gear apparatus. Therefore, a gear switch apparatus of a high performance and a high reliability is substituted in many cases while effectively utilizing the existing air insulating bus, etc. In order to cope with such a requirement, proposed to date as an equipment for power supply is a hybrid type gas insulation switch gear apparatus prepared by combining a plurality of switch gears for power supply such as an circuit breaker, and a disconnector or a disconnecting switch.

FIGS. 1 and 2 collectively show a general hybrid type gas insulation switch gear apparatus as an example of the hybrid switch gear apparatus, wherein FIG. 1 is a circuit diagram of a general hybrid type gas insulation switch gear apparatus, and FIG. 2 shows the construction of the hybrid type gas insulation switch gear apparatus connecting to the circuit diagram shown in FIG. 1.

The hybrid type gas insulation switch gear apparatus shown in FIG. 2 comprises a plurality of bushings 1-1, 1-2, an circuit breaker 2, a disconnecting switch 3, an earth switch 4, and a current transformer 5.

The circuit breaker 2 includes an enclosure 2C, which is arranged within an electric power station via supporting members 7 such that the axis of the enclosure 2C is parallel to the installing plane within the electric power station. A fixed electrode 2A and a movable electrode 2B capable of contact with the fixed electrode 2A are arranged within the enclosure 2C to constitute the circuit breaker 2. The fixed electrode 2A and movable electrode 2B are arranged on the same axis. An operating mechanism 8 for operating the movable electrode 2B is mounted to one open end of the enclosure 2C, and a bushing 1 having a central conductor 1A-1 connected to the movable electrode 2B is vertically mounted to a cylindrical connecting portion projecting upward from the circumferential surface of the enclosure 2C.

Also, the disconnecting switch 3 includes a cylindrical enclosure 3C, which is mounted within the electric power station via the supporting member 7 such that the axis of the enclosure 3C is perpendicular to the installing plane of the electric power station. A fixed electrode 3A and a movable electrode 3B capable of being moved to contact the fixed electrode 3A are arranged within the enclosure 3C to constitute the disconnecting switch 3. The fixed electrode 3A and the movable electrode 3B are arranged on the same axis. A disconnecting switch operating mechanism 9 for operating the earth switch 4 and the movable electrode 3B is mounted to the circumferential surface of the enclosure 3C. A cylindrical connecting portion projecting upward from the circumferential surface of the enclosure 3C of the disconnecting switch 3 is connected to the other open end of the enclosure 2C via a connecting cylinder 10 having a diameter smaller than that of the other end. Further, a bushing 1-2 including a central conductor 1A-2 connected to the fixed electrode 3A is vertically mounted to the open end positioned above the enclosure 3C.

Further, the current transformer 6 is mounted to the outer circumferential surface of the cylindrical connecting portion of the enclosure 2C, which is mounted to the mounting flange portion of the bushing 1-1 in a manner to surround the central conductor 1A-1. Also, the current transformer 5 is mounted to the outer circumferential surface of the connecting cylinder 10 in a manner to surround a current conductor.

Incidentally, a sealing gas such as a $SF_6$ gas is sealed in the enclosure 2C of the circuit breaker 2 and in the enclosure 3C of the disconnecting switch 3. In this case, the gas spaces of the enclosures 2C and 3C are partitioned by an insulating spacer that also serves to support the conductor arranged in the connecting portion between the enclosure 2C and the enclosure 3C.

In the hybrid type gas insulating switch gear apparatus of the construction described above, the circuit breaker 2 and the bushing 1 are independent of each other. Also, the circuit breaker 2 and the disconnecting switch 3 are housed in the different enclosures 2C and 3C. In addition, the enclosure 2C is installed such that the axis of the enclosure 2C is parallel to the installing plane, and the enclosure 3C is arranged such that the axis of the enclosure 3C is perpendicular to the installing plane. It follows that the entire hybrid type gas insulation switch gear apparatus is rendered bulky and heavy, with the result that a large installing area is required and the apparatus cost is rendered high.

In addition, it is necessary to install two current transformers for the discrimination between an accident in the circuit breaker and another accident in another portion.

FIG. 3 is a circuit diagram of a 1-½ bus as a layout of a representative substation. Incidentally, the switch gear apparatuses corresponding to the portions surrounded by broken lines, which are shown in FIG. 3, are equal to each other in construction. As shown in the drawing, the switch gear apparatus surrounded by each broken line comprises an circuit breaker 20 and two disconnecting switches 30 arranged to have the circuit breaker 20 sandwiched therebetween such that these circuit breaker 20 and the two disconnecting switches 30 are electrically connected in series. Incidentally, a reference numeral 90 denotes a current transformer.

FIG. 4 is a cross sectional view showing an example of the conventional hybrid type gas insulation switch gear apparatus used as such a 1-½ type hybrid type switch gear apparatus. Incidentally, it is also possible to use such a hybrid type gas insulation switch gear apparatus for the connection between the bushes of duplicate bus lines, though such bus lines are not shown in the drawing. To be more specific, the circuit breaker 20 arranged in the hybrid type gas insulation switch gear apparatus comprises a fixed electrode 21 and a movable electrode 22 both housed in an enclosure 2C and is opened or closed by an operating mechanism 28.

Disconnecting switches 30A, 30B formed in enclosures 3A, 3B, respectively, are arranged on both sides of the circuit breaker 20. The disconnecting switches 30A, 30B are opened and closed by operating mechanisms 34A, 34B, respectively. Also, the enclosures 3A, 3B are supported by a framework. The circuit breaker 20 and the disconnecting switch 30 are connected to each other via an adapter conductor X housed in a container.

Bushings 1-1, 1-2 are mounted to the enclosures 3A, 3B housing the disconnecting switches 30A, 30B via insulating spacers 60A, 80, respectively, and the internal conductors 1A-1, 1A-2 are connected to the disconnecting switches 30A, 30B, respectively. Further, earth switches 4A, 4B, which are constructed to be capable of being opened and closed by the operating mechanisms 43A, 43B, are arranged between the adapter conductor X and the disconnecting switch 30A and between the adapter conductor X and the disconnecting switch 30B, respectively. Incidentally, each of reference numerals 70A and 70B shown in FIG. 4 represents a current transformer.

It should be noted that, in the conventional hybrid type gas insulation switch gear apparatus described above, the distance between the circuit breaker 20 and the bushing 1-1 and the distance between the circuit breaker 20 and the bushing 1-2 tend to become longer, making it necessary to use a framework for supporting the bushings 1-1, 1-2 and the enclosures 3A, 3B. As a result, the entire apparatus tends to become bulky and heavier, leading to a high manufacturing cost. Also, the construction of the equipment is rendered complex, making it necessary to use various kinds of enclosures. It follows that the operating efficiency is rendered poor in the inspecting stage and in the event of an accident.

BRIEF SUMMARY OF THE INVENTION

An object of the present invention is to provide a hybrid type gas insulation switch gear apparatus, which permits miniaturizing and decreasing the weight of the entire apparatus and also permits decreasing the manufacturing cost.

According to a first aspect of the present invention, there is provided a hybrid type gas insulation switch gear apparatus, comprising:

a main enclosure including a first cylindrical section having a base and a second cylindrical section branched from the base, the first and second sections having first and second openings and first and second hollow spaces;

a bushing mounted on the first openings and including a hollow insulating housing having a housing space and a central conductor extended in the hollow insulating housing;

a first insulating spacer provided in the first cylindrical section and configured to separate the first hollow space into first and second segment spaces;

an insulating enclosure mounted to the second opening of the second cylindrical section and including an enclosure space, an insulating gas being sealed in the main enclosure and the insulating enclosure;

a second insulating spacer provided between the insulating enclosure and the second cylindrical section and configured to separate the enclosure space from the second hollow space;

a first fixed electrode electrically connected to the conductor and a first movable electrode which are received in the first cylindrical section to form a disconnecting switch;

an insulating member configured to support the first fixed electrode on the first cylindrical section;

a connecting conductor electrically connected to the first movable electrode of the disconnecting switch, arranged in the first cylindrical section, and including a branched conductor extending in the second cylindrical section;

a main electrode provided in the insulating enclosure;

a second movable electrode provided in the insulating enclosure and configured to be moved to the main electrode and electrically connected to the main electrode and the connecting conductor to form a circuit breaker connected to the disconnecting switch in series;

a current transformer arranged around the second cylindrical section to detect a current flowing through the connecting conductor; and an earth switch mounted to the first cylindrical section and including a movable counter electrode configured to connect and disconnect the fixed electrode of the disconnecting switch to the ground.

According to a second aspect of the present invention, there is provided a hybrid type gas insulation switch gear apparatus, comprising:

a main enclosure including a first cylindrical section having a base and second and third cylindrical sections branched from the base, the first, second and third sections having first, second and third openings and first, second and third hollow spaces;

first and second bushings mounted on first and third openings and including first and second hollow insulating housings having housing spaces and central conductors extended in the hollow insulating housing, respectively;

first and second insulating spacers provided in the first and third cylindrical sections and configured to separate the first and second hollow spaces into first and second segment spaces, respectively;

an insulating enclosure mounted to the second opening of the second cylindrical section and including an enclosure space, an insulating gas being sealed in the main enclosure and the insulating enclosure;

a second insulating spacer provided between the insulating enclosure and the second cylindrical section and configured to separate the enclosure space from the second hollow space;

first and second fixed electrode electrically connected to the first and second conductors and first and second movable electrode which are received in the first and third cylindrical sections to form first and second disconnecting switches, respectively;

first and second insulating members configured to support the first and second fixed electrodes on the first and third cylindrical sections, respectively;

a connecting conductor electrically connected to the first and second movable electrode of the first and second disconnecting switches arranged in the first and third cylindrical sections, and including a branched conductor extending in the second cylindrical section;

a main electrode provided in the insulating enclosure;

a second movable electrode provided in the insulating enclosure and configured to be moved to the main electrode and electrically connected to the main electrode and the connecting conductor to form a circuit breaker connected to the first and second disconnecting switch in series, respectively;

a current transformer arranged around the second cylindrical section to detect a current flowing through the connecting conductor; and first and second earth switch mounted to the first and third cylindrical sections and including a movable counter electrode configured to connect and disconnect the first and second fixed electrodes of the disconnecting switch to the ground.

According to a third aspect of the present invention, there is provided a hybrid type gas insulation switch gear apparatus, comprising:

a main enclosure including a hollow base section and first and second cylindrical sections branched from the hollow base section, the first and second sections having first and second openings and first and second hollow spaces;

first and second bushings mounted on first and second openings and including first and second hollow insulating housings having housing spaces and central conductors extended in the hollow insulating housing, respectively;

first and second insulating spacers provided in the first and second cylindrical sections and configured to separate the first and second hollow spaces into first and second segment spaces, respectively;

first and second fixed electrode electrically connected to the first and second conductors and first and second movable electrode which are received in the first segment spaces of the first and second cylindrical sections to form first and second disconnecting switches, respectively;

first and second insulating members configured to support the first and second movable electrode on the first and third cylindrical sections, respectively;

a connecting conductor electrically connected to the first and second fixed electrodes of the first and second disconnecting switches, arranged in the first and second cylindrical sections and the hollow base section;

a main electrode provided in the hollow base section;

a second movable electrode provided in hollow base section and configured to be moved to the main electrode and electrically connected to the main electrode and the connecting conductor to form a circuit breaker connected to the first and second disconnecting switch in series, respectively;

current transformers arranged around the first and second cylindrical sections to detect a current flowing through the connecting conductor; and first and second earth switch mounted to the first and second cylindrical sections and including a movable counter electrode configured to connect and disconnect the first and second fixed electrodes of the disconnecting switch to the ground.

According to a fourth aspect of the present invention, there is provided a hybrid type gas insulation switch gear apparatus, comprising:

a main enclosure including a first cylindrical section having a base and a second cylindrical section branched from the base of the first cylindrical section, the first and second sections having first and second openings and first and second hollow spaces;

first and second bushings mounted on first and second openings and including first and second hollow insulating housings having housing spaces and central conductors extended in the hollow insulating housing, respectively;

first and second insulating spacers provided in the first and second cylindrical sections and configured to separate the first and second hollow spaces into first and second segment spaces, respectively;

first and second movable electrode electrically connected to the first and second conductors and first and second fixed electrode which are received in the first segment spaces of the first and second cylindrical sections to form first and second disconnecting switches, respectively;

first and second insulating members configured to support the first and second fixed electrodes on the first and third cylindrical sections, respectively;

connecting conductors electrically connected to the first and second fixed electrodes of the first and second disconnecting switches, arranged in the first and second cylindrical sections and-the hollow base section;

a main electrode provided in the base of the first cylindrical section and connected to corresponding one of the connecting conductors;

a second movable electrode provided in the base of the first cylindrical section and configured to be moved to the main electrode and electrically connected to the main electrode and another one of the connecting conductors to form a circuit breaker connected to the first and second disconnecting switch in series, respectively;

current transformers arranged around the first and second cylindrical sections to detect a current flowing through the connecting conductor; and first and second earth switch mounted to the first and second cylindrical sections and including a movable counter electrode configured to connect and disconnect the first and second fixed electrodes of the disconnecting switch to the ground.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawing, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

Figure 1:
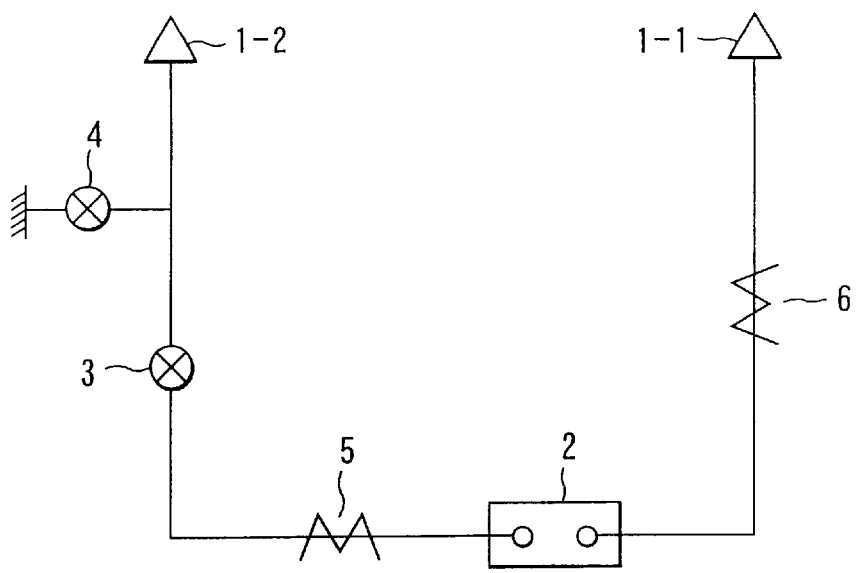
FIG. 1 is a circuit diagram schematically showing the circuit of the conventional hybrid type gas insulation switch gear apparatus.
Figure 3:
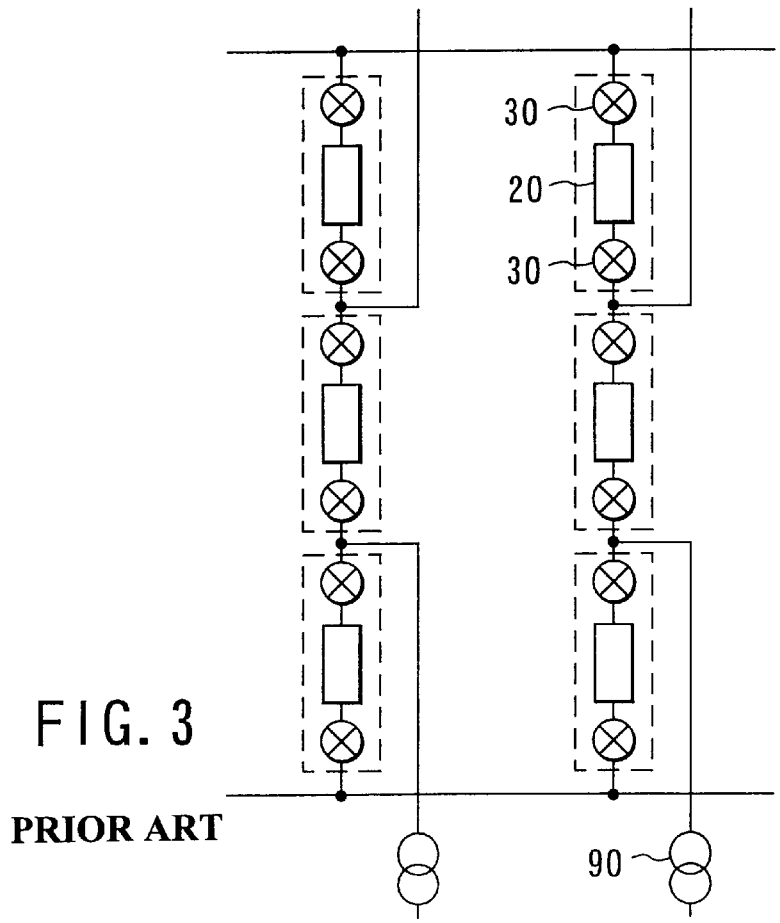
FIG. 3 is a circuit diagram schematically showing the circuit of the conventional hybrid type gas insulation switch gear apparatus of the 1-½ system.
Figure 2:
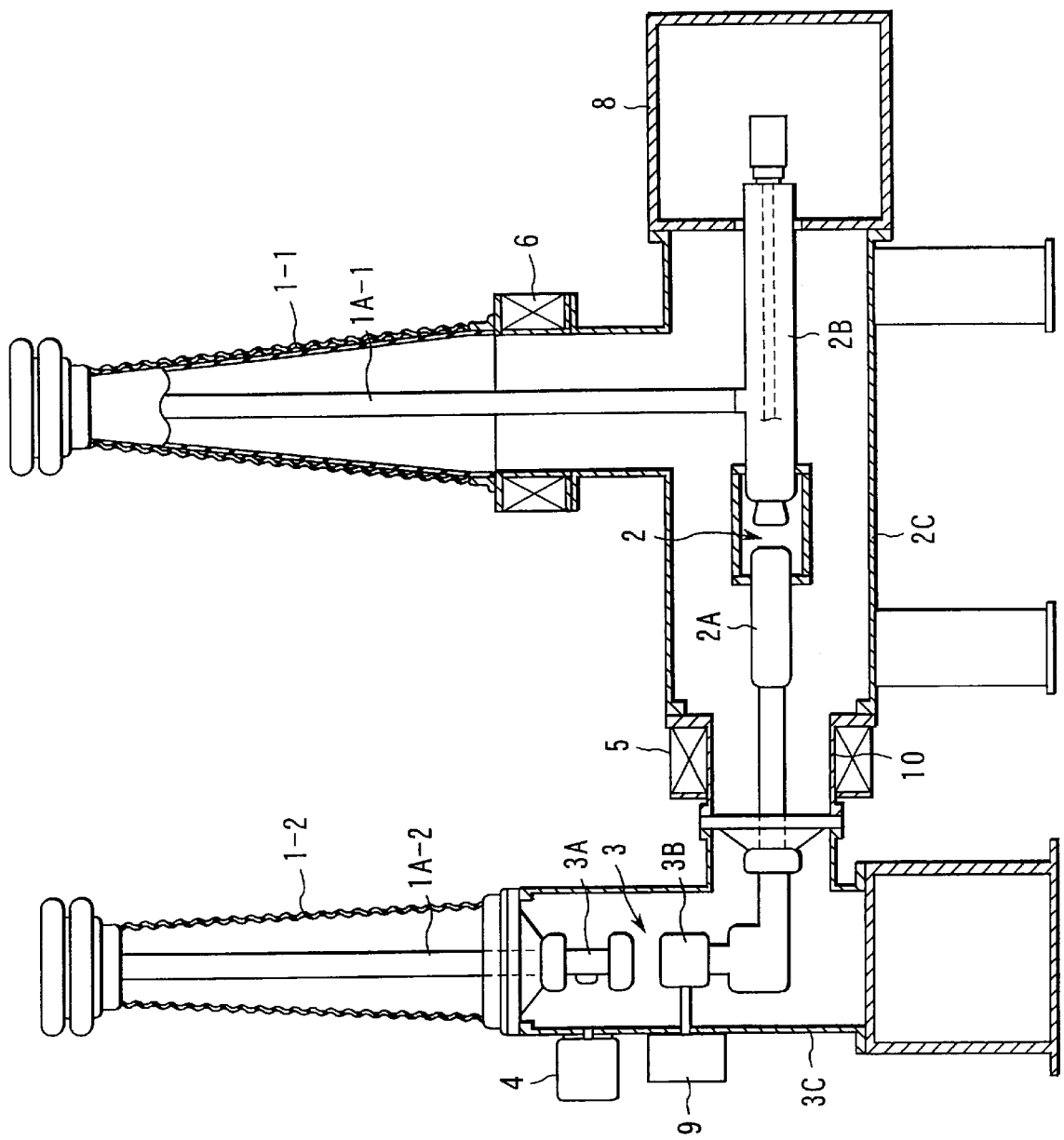
FIG. 2 is a cross sectional view schematically showing the construction of the conventional hybrid type gas insulation switch gear apparatus.
Figure 4:
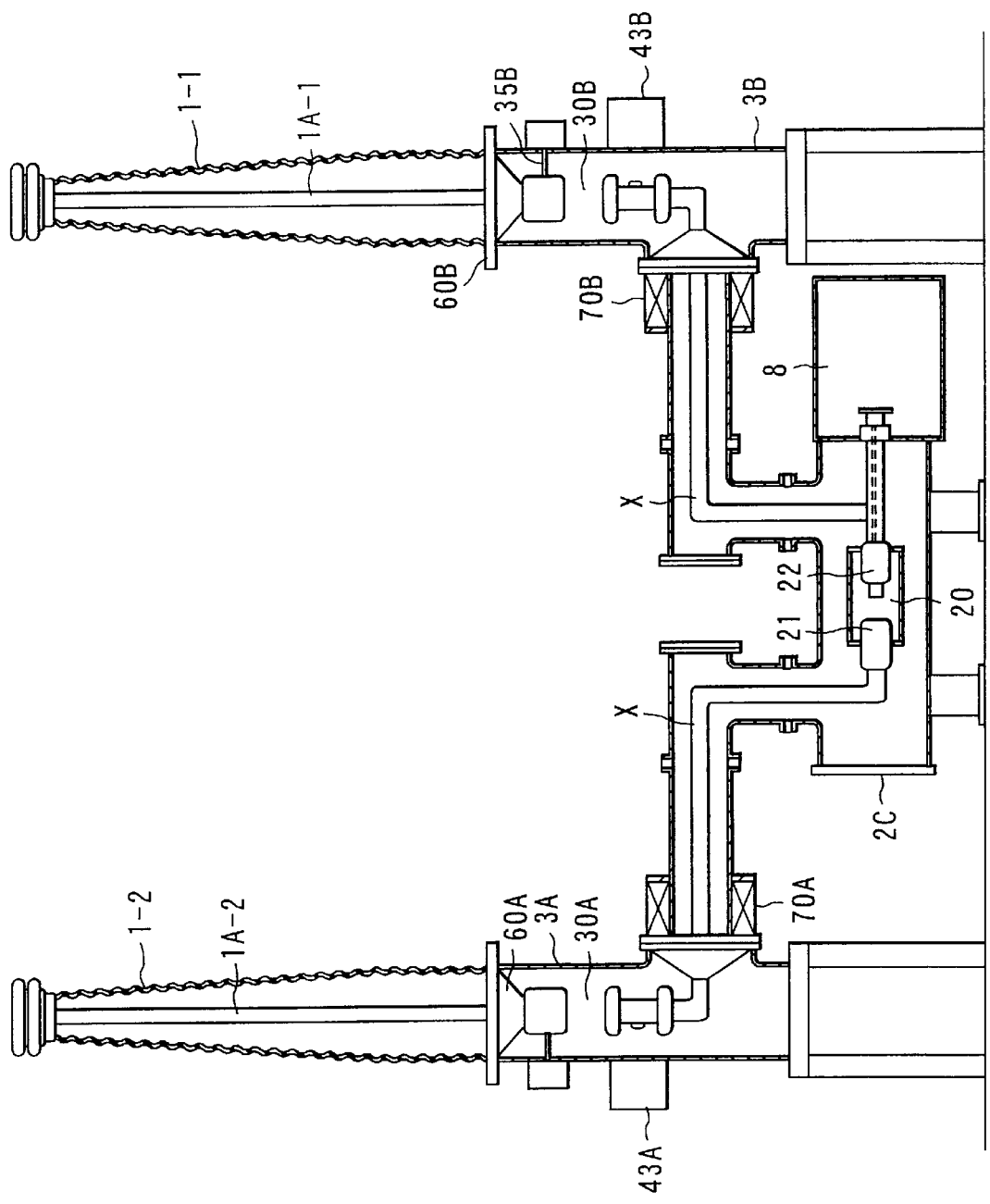
FIG. 4 is a cross sectional view schematically showing the construction of the conventional hybrid type gas insulation switch gear apparatus of the 1-½ system.

Some embodiments of the hybrid type gas insulation switch gear apparatus of the present invention will now be described with reference to the accompanying drawings. Throughout the drawings, the same reference numerals are put to denote the same members of the apparatus so as to avoid the overlapping description and, thus, to simplify the description of the specification.

Figure 5:
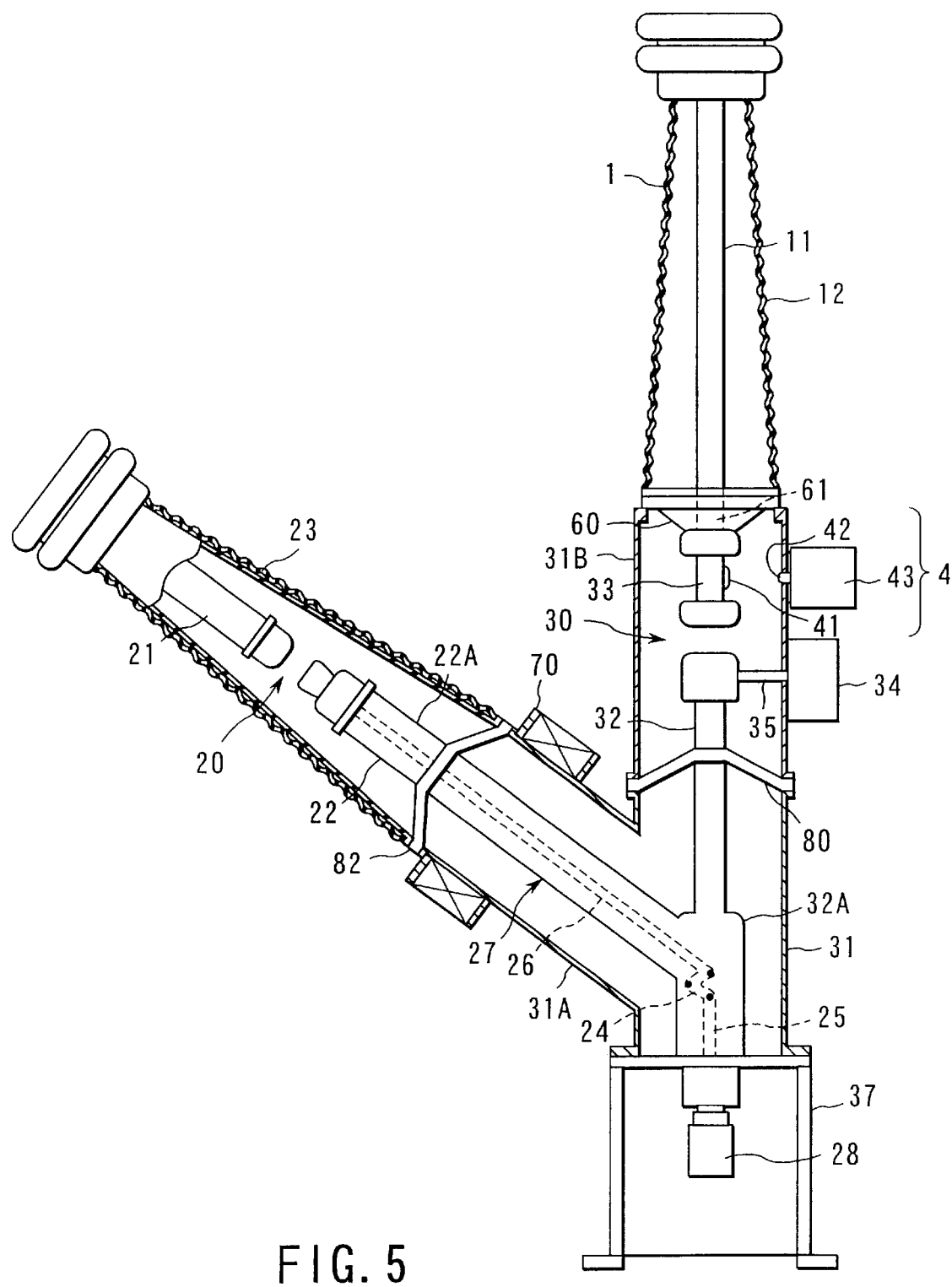
FIG. 5 is a cross sectional view schematically showing the construction of a hybrid type gas insulation switch gear apparatus according to a first embodiment of the present invention.
Figure 6:
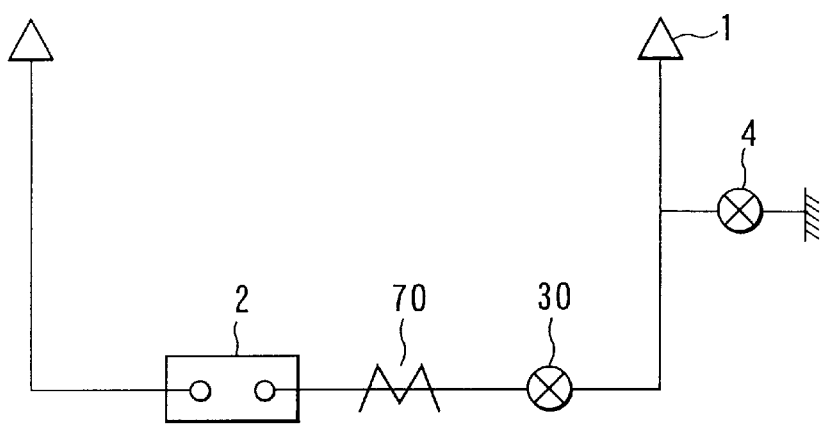
FIG. 6 is a circuit diagram schematically showing the circuit of the hybrid type gas insulation switch gear apparatus shown in FIG. 5.

FIGS. 5 and 6 collectively show a hybrid type gas insulation switch gear apparatus according to first embodiment of the present invention, wherein FIG. 5 is a cross sectional view schematically showing the construction of the hybrid type gas insulation switch gear apparatus according to the first embodiment of the present invention, and FIG. 6 is a circuit diagram showing the circuit of the hybrid type gas insulation switch gear apparatus shown in FIG. 5.

In FIG. 5, a reference numeral 31 denotes an enclosure of a disconnecting switch 30. The enclosure 31 is substantially V-shaped, and comprises a cylindrical main housing 31B extending substantially in a vertical direction and a cylindrical branched section 31A branched from the circumferential surface of the cylindrical main housing 31B and extending in an inclined fashion obliquely upward. The enclosure 31 is mounted to a supporting member 37 such that the axis of the enclosure 31 is perpendicular to the installing plane of the electric power station.

Housed in the cylindrical main housing 31B are a fixed electrode 33 and a movable electrode 32 capable of movement to contact the fixed electrode 33, which constitute the disconnecting switch 30. The fixed electrode 33 and the movable electrode 32 are arranged on the same axis. An insulating space 60 is arranged in an upper open portion of the enclosure 31. An electrode 61 mounted to one end of a central conductor 11 is supported by and fixed to the spacer 60, and the fixed electrode 33 is mounted to and supported by the electrode 61. Also, the movable electrode 32 is supported by an insulating spacer 80 and is movably supported by a hollow conductor 32A mounted to the supporting member 37. Also, the cylindrical main housing 31B of the enclosure 31 is separated with the insulating spacer 80 to have the space of the disconnecting switch 30 and another space.

Also, a bushing 12 is arranged on the insulating spacer 60 mounted on the upper open edge of the enclosure 31 independently of the enclosure 31 of the disconnecting switch 30. In the bushing 12, a hollow porcelain 1 is mounted in a vertical direction, and a central conductor 11 extends within the hollow porcelain 1. The central conductor 11 is electrically connected to the fixed electrode 33 via an electrode 61 mounted to the insulating spacer 60 referred to previously.

A primary electrode 41 constituting the earth switch 4 is mounted to a part of the circumferential surface of the fixed electrode 33. Also, an operating mechanism 43 for operating the earth switch 4 is mounted to the outer circumferential surface of the enclosure 31. The earth switch operating mechanism 43 performs the function of moving the movable electrode 42 constituting the earth switch 4 such that the movable electrode 42 is capable of contact with the primary electrode 41. The movable electrode 42 is brought into contact with the primary electrode 41 by the operating mechanism 43 so as to electrically connect the fixed electrode 33 to the ground. Also, the movable electrode 42 is moved away from the primary electrode 41 by the operating mechanism 43 so as to electrically disconnect the fixed electrode 33 from the ground.

An operating mechanism 34 for operating the movable electrode 32 is mounted to the outer circumferential surface of the enclosure 31. The operating mechanism 34 includes an operating rod 35 for moving the movable electrode 32. The operating rod 35 is moved by the operating mechanism 34, with the result that the movable portion of the movable electrode 32 is moved toward or away from the fixed electrode. To be more specific, the movable portion of the movable electrode 32 is brought into contact with the stationary electrode of the fixed electrode 33 so as to achieve an electrical connection between the movable electrode 32 and the fixed electrode 33. Also, the movable portion of the movable electrode 32 is moved away from the stationary electrode of the fixed electrode 33 so as to achieve an electrical disconnection between the movable electrode 32 and the fixed electrode 33.

On the other hand, in the circuit breaker 20, a ceramic or porcelain enclosure 23 performing the function of a bushing is mounted to the open edge of the cylindrical branched portion 31A extending from the cylindrical main envelope 31 to the circuit breaker 20. Arranged in the porcelain enclosure 23 are a fixed electrode 21 and a movable electrode 22 capable of movement to contact the fixed electrode 21, which constitute the circuit breaker 20. The fixed electrode 21 and the movable electrode 22 are arranged on the same axis. It should be noted that the porcelain enclosure 23 performs the function of a bushing consisting of a housing and a central conductor and also performs the function of the circuit breaker 20. The fixed electrode 21 is mounted to the tip portion of the porcelain enclosure 23, and the movable electrode 22 is connected to a hollow conductor 32A connected to the movable electrode 32 via a hollow conductor 22A, the hollow conductor 32A communicating with said hollow conductor 22A. In other words, the movable electrode 32 is formed in substantially Y-shape such that the hollow conductor 22A and the hollow conductor 32A have a common proximal end so as to communicate with each other. The hollow conductor 22A is supported by an insulating spacer 82, and the space of the cylindrical branched portion 31A of the enclosure 31 and the space within the porcelain enclosure 23 are partitioned by the insulating spacer 82, with the result that the circuit breaker 20 is separated from the space within the enclosure 31.

An operating mechanism 28 for operating the circuit breaker is mounted to the lower edge portion of the hollow conductor 32A mounted to the supporting member 37. The circuit breaker operating mechanism 28 includes an operating rod 25 operated by the operating mechanism 28, a changing lever 24 extending within the hollow conductor 22A and the hollow conductor 32A and joined to the operating rod 25 so as to change the direction of the driving force transmitted from the operating rod 25, and a link 26 arranged within the hollow conductor 22A, joined via the changing lever 24 and imparted with the driving force whose direction has been changed by the changing lever 24. The link 26 is connected to the movable portion of the movable electrode 22 on the side of the circuit breaker 20. If the driving force is imparted from the operating rod 25 to the link 26, the movable electrode 22 of the circuit breaker 20 is moved toward and away from the stationary electrode of the fixed electrode 21.

Further, a current transformer 70 is mounted to the outer circumferential surface of the circuit breaker 20 in a manner to surround the hollow conductor 22A. To be more specific, the current transformer 70 is mounted in the vicinity of the open edge portion of the cylindrical branched portion 31A of the enclosure 31.

Incidentally, an insulating gas such as a $SF_6$ gas is sealed in the two spaces within the enclosure 31 of the disconnecting switch 30 separated by the insulating spacer 80, in the space within the cylindrical branched portion 31A, and in the porcelain enclosure 23 partitioned from the cylindrical branched portion 31A by the insulating spacer 82.

In the hybrid type gas insulation switch gear apparatus of the construction described above, the cylindrical branched portion 31A is arranged in the enclosure 31, the porcelain enclosure 23 is mounted to the cylindrical branched portion 31A, and the fixed electrode 21 and the movable electrode 22 of the circuit breaker 20 are housed in the porcelain enclosure 23. It follows that the porcelain enclosure 23 performs the function of the bushing consisting of the hollow housing and the central conductor, making it unnecessary to arrange an independent bushing. In this case, it suffices to arrange a single bushing 12 on the side of the enclosure 31 of the disconnecting switch 30. It should also be noted that, since the circuit breaker is arranged within the porcelain enclosure 23, the earth short-circuiting accident can be minimized so that the reliability of the apparatus can be improved.

As described above, since the circuit breaker 20 is arranged within the porcelain enclosure 23, the earth short-circuiting accident can be eliminated and, thus, a second current transformer is not required. Also, the gas in the circuit breaker 20 is partitioned from the gas in the driving section 7 by the insulating spacer 80. Likewise, the gas in the circuit breaker 20 is partitioned from the gas in the disconnecting switch 30 by the insulating spacer 82. It follows that it suffices to detach the minimum required region in the inspecting stage and the restoring stage. As a result, it suffices to apply the inspecting operation and the restoring operation to the minimum required region. What should also be noted is that, since the gas within the apparatus is partitioned, it is possible to prevent the driving section 27 of the circuit breaker 20 and the disconnecting switch 30 from being exposed to the hot gas or the decomposed gas in the event of a large current interruption so as to improve the operating efficiency and the safety.

Figure 7:
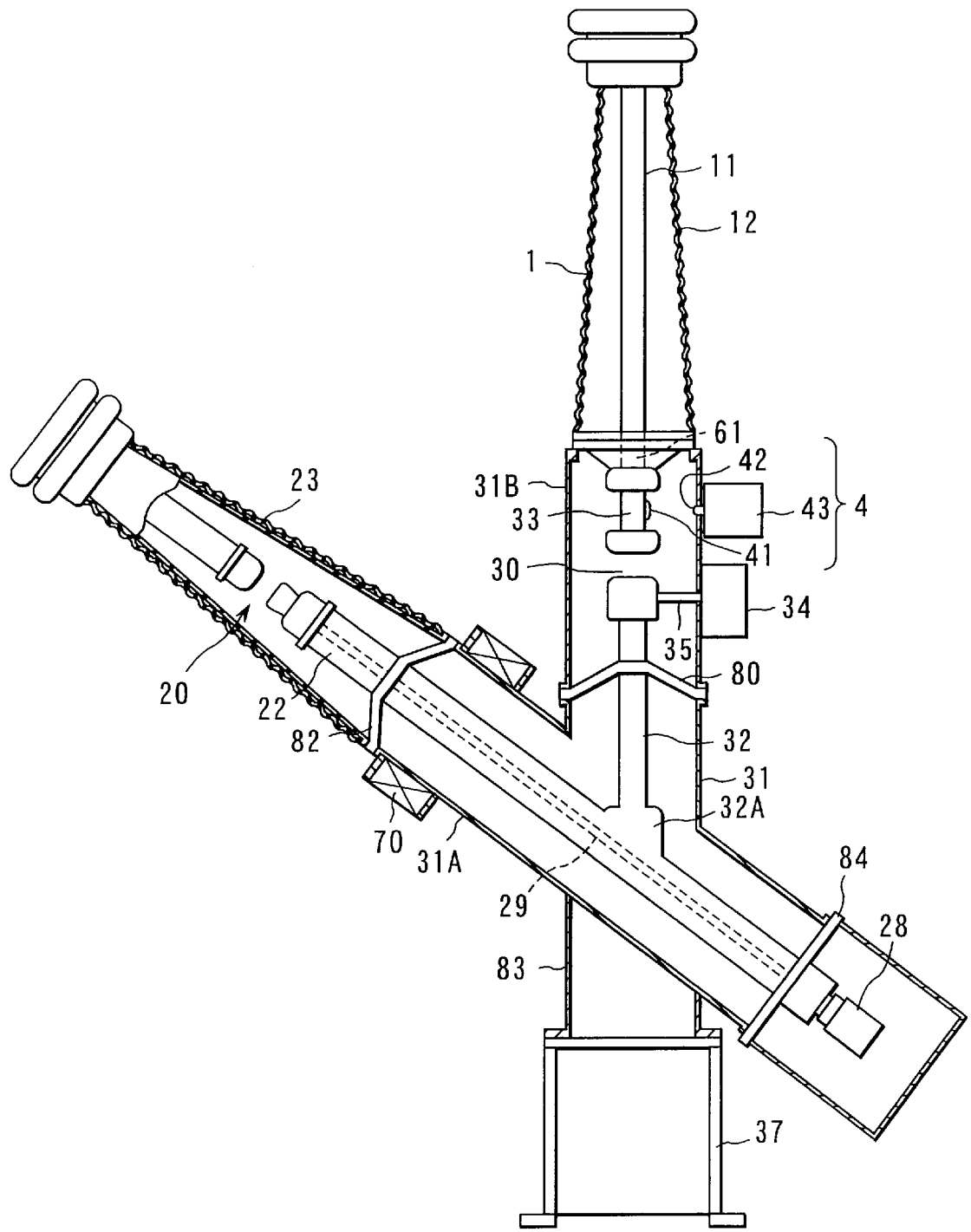
FIG. 7 is a cross sectional view schematically showing the construction of a hybrid type gas insulation switch gear apparatus according to a second embodiment of the present invention.

FIG. 7 shows the construction of a hybrid type gas insulation switch gear apparatus according to a second embodiment of the present invention. The members of the apparatus common with FIGS. 5 and 7 are denoted by the same reference numerals so as to avoid the overlapping description.

In the hybrid type gas insulation switch gear apparatus according to the second embodiment of the present invention, the enclosure 31 is substantially Y-shaped as shown in FIG. 7, though the enclosure 31 is V-shaped in the embodiment shown in FIG. 5. The cylindrical branched portion 31A communicating with the cylindrical main housing 31B is arranged oblique relative to the cylindrical main housing 31B that is arranged substantially vertical so as to support the cylindrical main housing 31B. The cylindrical branched portion 31A is supported by a supporting tower 83 mounted to the supporting member 37. A hollow conductor 32A and a hollow conductor 22A are arranged in the enclosure 31 to form a substantially Y-shaped configuration. To be more specific, the hollow conductor 22A oblique extends within the cylindrical branched portion 31A so as to be joined to an circuit breaker operating mechanism 28 mounted to a lid portion 84 closing the open portion of the cylindrical branched portion 31A. A linear operating rod 29 joined to the movable electrode of the circuit breaker 20 is arranged within the cylindrical branched portion 31A. To be more specific, the operating mechanism 28 is arranged on the axis of the electrode of the circuit breaker 20, and the operating mechanism 28 and the circuit breaker 20 are joined to each other by the linear operating rod 29. Also, the hollow conductor 32A communicating with the hollow conductor 22A extends from midway of the hollow conductor 22A within the cylindrical main housing 31B. The cylindrical main housing 31B is partitioned by the insulating spacer 80 into two spaces. Also, the cylindrical branched portion 31A is partitioned from the porcelain enclosure 23 by the insulating spacer 82. An insulating gas such as a $SF_6$ gas is sealed in these spaces.

In the hybrid type gas insulation switch gear apparatus of the construction described above, it is possible.to obtain the function and effect similar to those obtained in the apparatus of the first embodiment described previously. Also, since the changing lever is omitted in the second embodiment shown in FIG. 7, the circuit breaker 20 can be operated by sliding the linear operating rod 29 alone. It follows that it is possible to simplify the driving section of the hybrid type gas insulation switch gear apparatus.

Figure 9:
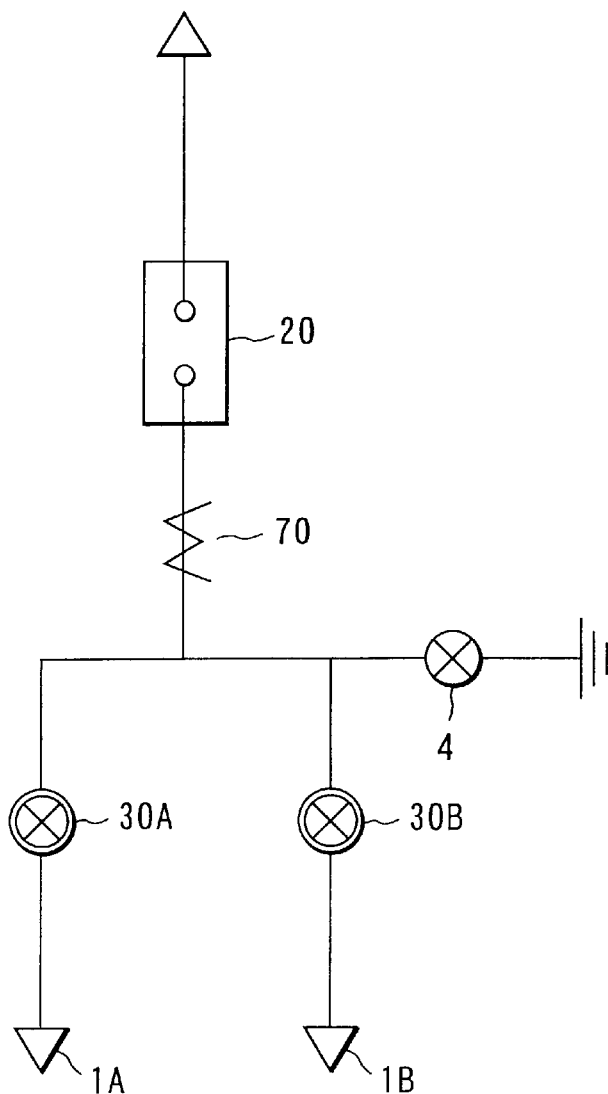
FIG. 9 is a circuit diagram schematically showing the circuit of the hybrid type gas insulation switch gear apparatus shown in FIG. 8.
Figure 8:
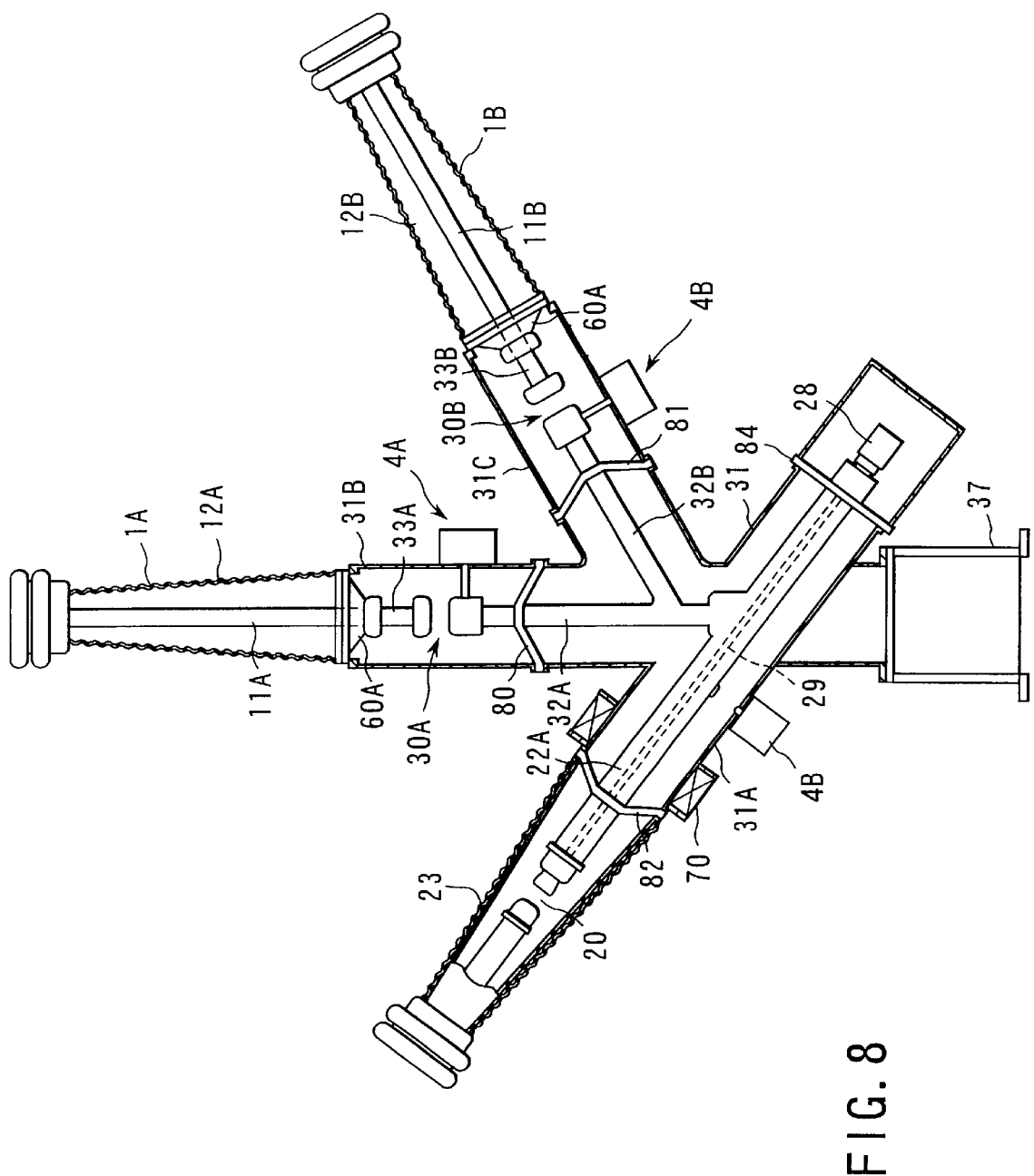
FIG. 8 is a cross sectional view schematically showing the construction of a hybrid type gas insulation switch gear apparatus according to a third embodiment of the present invention.

FIGS. 8 and 9 show the construction and the circuit diagram of a hybrid type gas insulation switch gear apparatus according to a third embodiment of the present invention. The members of the apparatus common with FIG. 5 and FIGS. 8 and 9 are denoted by the same reference numerals so as to avoid the overlapping description.

In the hybrid type gas insulation switch gear apparatus according to the third embodiment of the present invention, the enclosure 31 is substantially Y-shaped as shown in FIG. 8, though the enclosure 31 is V-shaped in the embodiment shown in FIG. 5. The cylindrical branched portion 31A is joined to and communicates with the first and second cylindrical main housings 31B, 31C. The cylindrical branched portion 31A is arranged oblique relative to the first cylindrical main housing 31 that is arranged substantially vertical. Also, the second cylindrical main housing 31C is arranged oblique relative to the first cylindrical main housing 31B. The cylindrical branched portion 31A supporting the first and second cylindrical main housings 31B, 31C is supported by the supporting tower 83 mounted to the supporting member 37. The disconnecting switches 30A, 30B are mounted in the first and second cylindrical main housings 31B, 31C, respectively. As shown in FIG. 9, the disconnecting switches 30A, 30B are connected in parallel and each of these disconnecting switches 30A, 30B is connected in series to the circuit breaker 20.

The hollow conductors 32A, 32B and 22A are arranged in the enclosure 31 to form a substantially W-shaped configuration. To be more specific, the hollow conductor 22A obliquely extends within the cylindrical branched portion 31A. The hollow conductor 32A communicating with the hollow conductor 22A extends from midway of the hollow conductor 22A within the first cylindrical main housing 31B. Further, the hollow conductor 32B extends from midway of the hollow conductor 32A within the second cylindrical main housing 31C. The first and second cylindrical main housings 31B, 31C are divided into two spaces by the insulating spacers 80, 81. Also, the cylindrical branched portion 31A is partitioned from the porcelain enclosure 23 by the insulating spacer 82. An insulating gas such as a $SF_6$ gas is sealed in these spaces. Incidentally, in FIG. 8, reference numerals 60A and 60B denote the insulating spacers for supporting the fixed electrodes 32A, 32B within the first and second cylindrical main housings 31B, 31C, respectively. Also, insulating enclosures 12A, 12B are mounted to the first and second enclosures 31B, 31C via the conductors 11A, 11B of the bushings 1A, 1B and the insulating spacers 60A, 60B for connecting and supporting the disconnecting switches 30A, 30B, respectively. Further, a current transformer 70 and earth switches 4A, 4B are arranged in the enclosures 30A, 30B.

According to the hybrid type gas insulation switch gear apparatus of the construction described above, it is possible to obtain the function and effect similar to those obtained by the apparatus according to each of the first and second embodiments described previously. Also, the apparatus according to the third embodiment of the present invention can be applied effectively to a substation of a duplicate bus line system among the substations in which is used a hybrid type gas insulation switch gear apparatus. To be more specific, in the apparatus according to the third embodiment of the present invention, the gas within the circuit breaker 20 and the two disconnecting switches 30A, 30B is partitioned, with the result that, even if an accident has taken place in any one of the disconnecting switches 30A and 30B, it is possible to avoid the power failure of the entire apparatus by stopping the single bus line.

Figure 10:
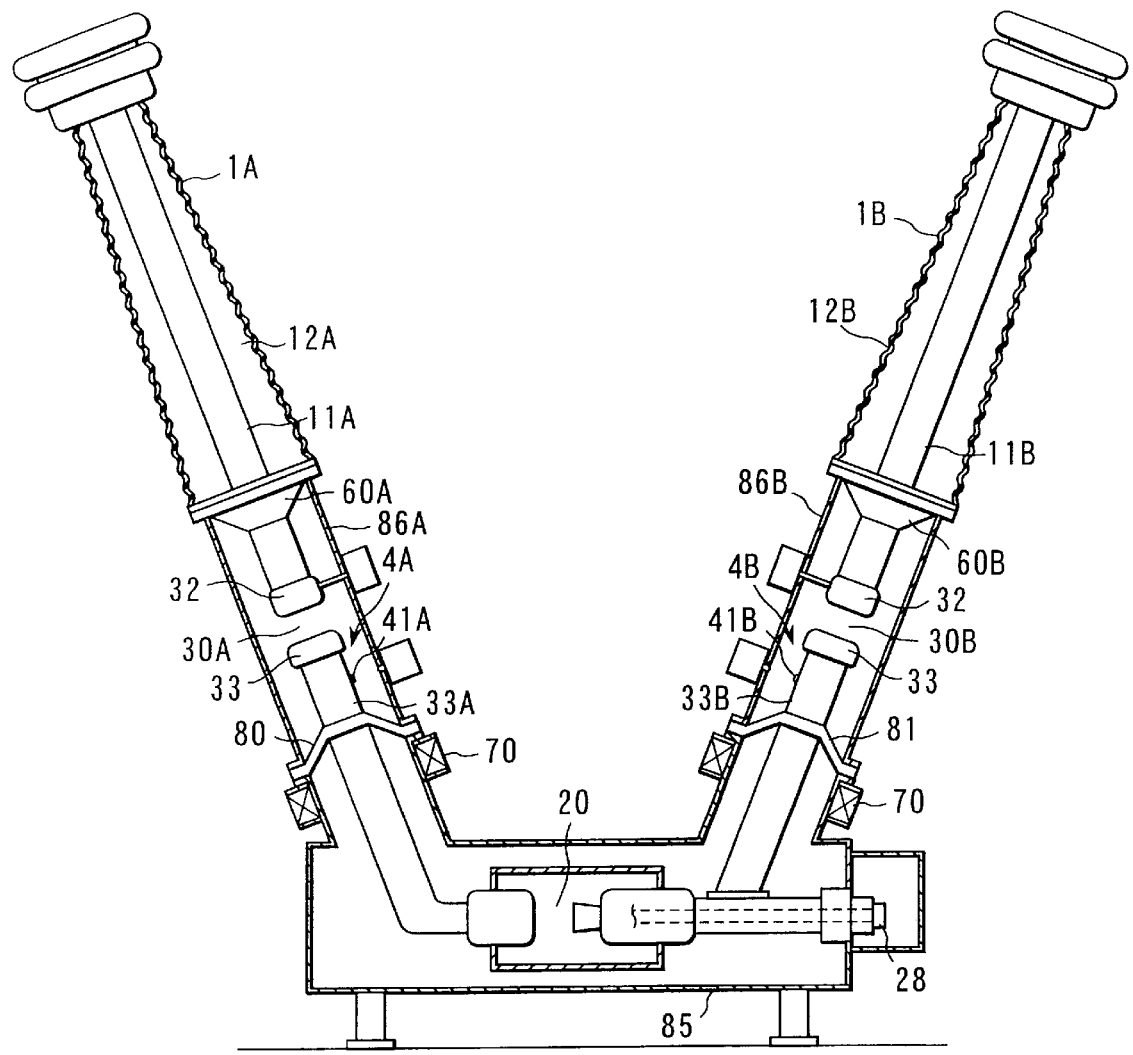
FIG. 10 is a cross sectional view schematically showing the construction of a hybrid type gas insulation switch gear apparatus according to a fourth embodiment of the present invention.
Figure 11:
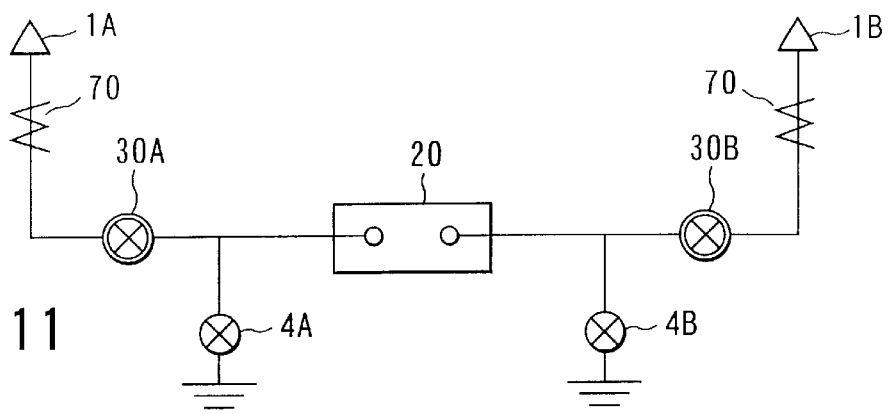
FIG. 11 is a circuit diagram schematically showing the circuit of the hybrid type gas insulation switch gear apparatus shown in FIG. 10.

FIGS. 10 and 11 show the construction and the circuit diagram of a hybrid type gas insulation switch gear apparatus according to a fourth embodiment of the present invention. The members of the apparatus common with FIG. 8 and FIGS. 10 and 11 are denoted by the same reference numerals so as to avoid the overlapping description.

In the hybrid type gas insulation switch gear apparatus according to the fourth embodiment of the present invention, which is shown in FIG. 10, the circuit breaker 20 is arranged horizontal so as to arrange the circuit breaker in a lateral type enclosure 85. Two branched portions 86A and 86B differing from each other in the angle relative to the axis of the enclosure 85 are mounted to the upper surface of the enclosure 85 so as to assume a substantially V-shaped configuration. The gas space of the branched portions 86A, 86B is partitioned by the insulating spacers 80, 81.

The disconnecting switches 30A, 30B are housed, respectively, in the spaces of the branched portions 86A, 86B to form the disconnecting switches 30A, 30B, which are partitioned from the enclosure and are electrically connected to both sides of the circuit breaker 20. The earth switches 4A, 4B are also provided on the branched portions 86A, 86B, respectively. The fixed electrodes 32A, 32B in the disconnecting switches 30A, 30B on the side of the circuit breaker 20 and the primary electrodes 41A, 41B of the earth switches 4A, 4B are supported by the insulating spacer 80. The insulating enclosures 12A, 12B are mounted to the branched portions 86A, 86B acting as the first and second enclosures via the conductors 11A, 11B of the bushings 1A, 1B and the insulating spacers 60A, 60B serving to support and connect the disconnecting switches 30A, 30B.

In the hybrid type gas insulation switch gear apparatus shown in FIG. 10, the disconnecting switches 30A, 30B are arranged on the both sides of the circuit breaker 20. It follows that the apparatus shown in FIG. 10 can be effectively applied to not only the 1·½CB type but also the single bus line type in the circuit construction of a substation in which is used the hybrid type gas insulation switch gear apparatus.

Figure 12:
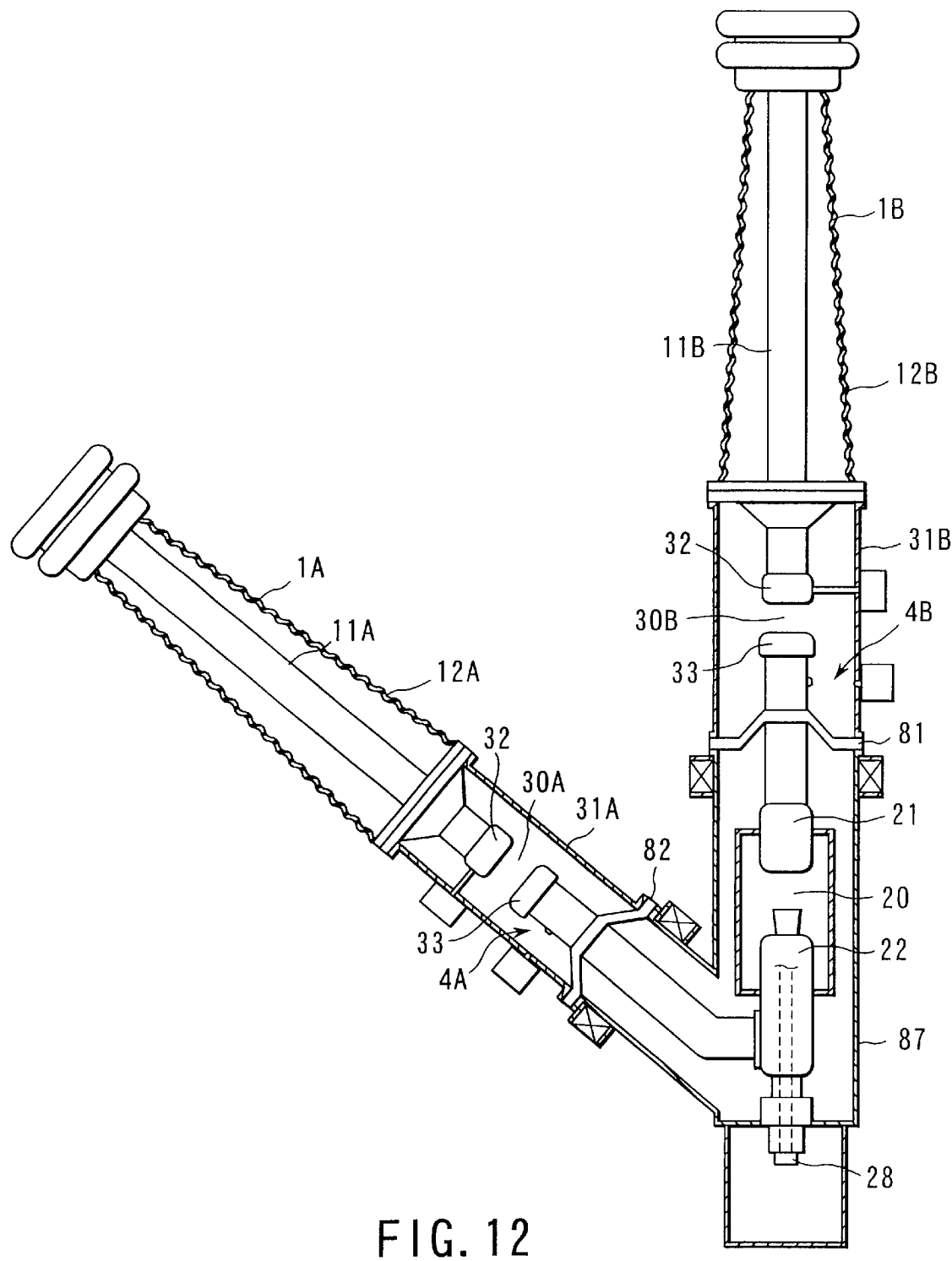
FIG. 12 is a cross sectional view schematically showing the construction of a hybrid type gas insulation switch gear apparatus according to a fifth embodiment of the present invention.

FIG. 12 shows the construction of a hybrid type gas insulation switch gear apparatus according to a fifth embodiment of the present invention. The members of the apparatus common with FIGS. 10 and 12 are denoted by the same reference numerals so as to avoid the overlapping description.

In the hybrid type gas insulation switch gear apparatus shown in FIG. 12, the circuit breaker 20 is received in the enclosure 87 which is arranged in the vertical direction. The branched portion 31A alone is extended obliquely upward from the enclosure 87. The disconnecting switches 30A, 30B are arranged in the space of the branched portion 31A partitioned by the insulating spacer 82 and in the space of the enclosure 87 partitioned by the insulating spacer 82, respectively. Also, the circuit breaker 20 is arranged in the space of the enclosure 87 partitioned by the insulating spacer 82.

According to the hybrid type gas insulation switch gear apparatus shown in FIG. 12, it is possible to obtain the function and effect similar to those obtained by the apparatus according to the fourth embodiment of the present invention described previously. In addition, since the number of branched portions of the enclosure itself can be decreased, it is possible to simplify the construction of the apparatus. It is also possible to markedly diminish the installing area of the entire apparatus in the horizontal direction. Further, it should be noted that, in the case of using such a hybrid type gas insulation switch gear apparatus, specified is the required height to the charging sections of the bushings 1A, 1B in terms of the safety. In the fifth embodiment shown in FIG. 12, the circuit breaker 20 is arranged in the vertical direction so as to ensure the required height of the bushings 1A, 1B by effectively utilizing the height of the circuit breaker 20.

Figure 13:
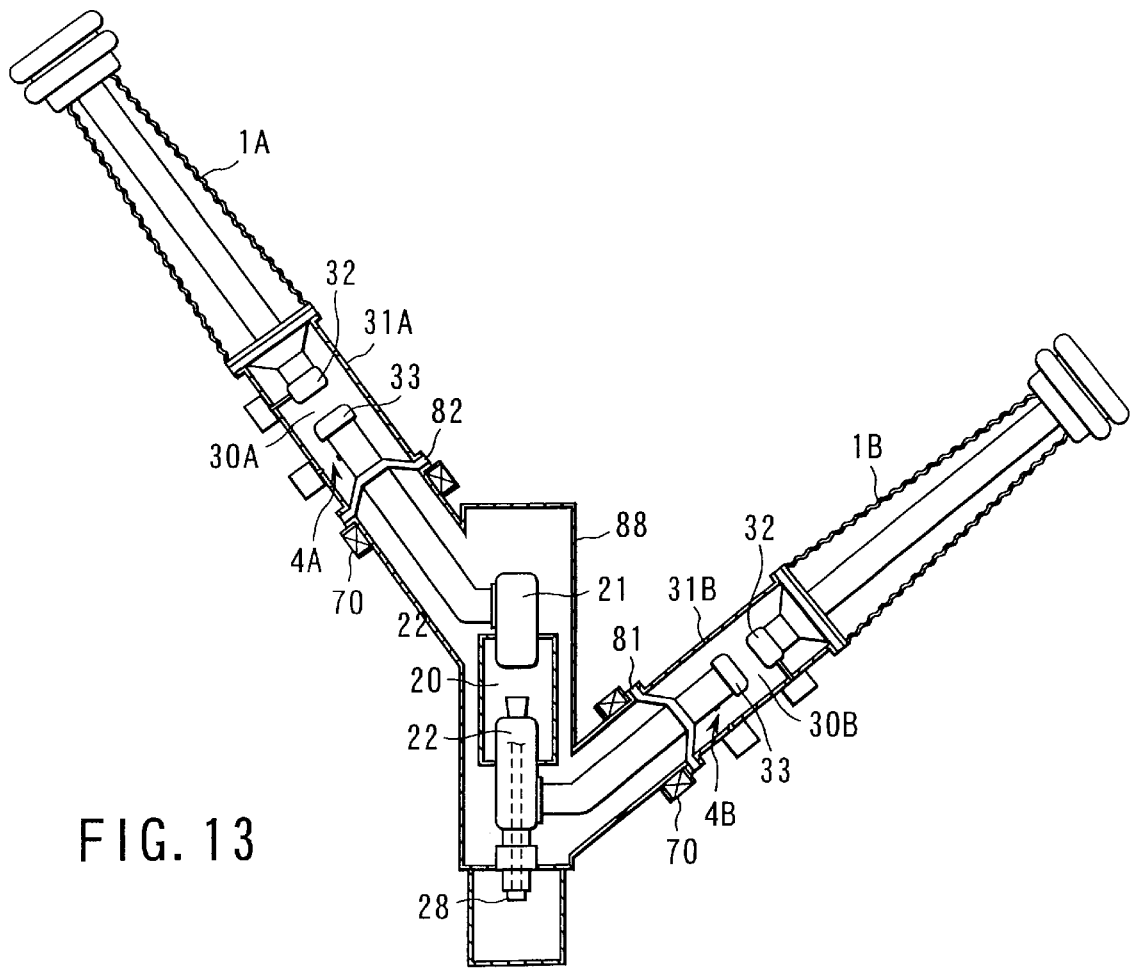
FIG. 13 is a cross sectional view schematically showing the construction of a hybrid type gas insulation switch gear apparatus according to a sixth embodiment of the present-invention.

FIG. 13 shows the construction of a hybrid type gas insulation switch gear apparatus according to a sixth embodiment of the present invention. The members of the apparatus common with FIGS. 12 and 13 are denoted by the same reference numerals so as to avoid the overlapping description.

In the hybrid type gas insulation switch gear apparatus shown in FIG. 13, the enclosures 31A, 31B are arranged as two branched portions differing from each other in height and extending in directions getting apart from each other to the side surfaces of the enclosure 88 housing the circuit breaker 20. The disconnecting switch 30A, 30B are received in the enclosures 31A, 31B and the earth switches 4A, 4B are provided on the enclosures 31A, 31B.

According to the hybrid type gas insulation switch gear apparatus shown in FIG. 13, it is possible to obtain the function and effect similar to those obtained by the apparatus according to the fifth embodiment of the present invention described previously. In addition, the insulating spacers 80, 81 serving to partition the gas in the circuit breaker 20 from the gas in the disconnecting switch 30A and the gas in the circuit breaker 20 from the gas in the disconnecting switch 30B, respectively, serve to prevent the disconnecting switches 30A and 30B from being exposed directly to the hot gas generated when a large current is interrupted. In addition, the insulating distances of the bushings 1A and 1B from the ground can be ensured easily so as to further improve the safety.

FIGS. 14 to 22 show the constructions of the hybrid type gas insulation switch gear apparatuses according to modifications of the embodiments of the present invention. The members of the apparatus common with FIG. 12 and FIGS. 14 to 22 are denoted by the same reference numerals so as to avoid the overlapping descriptions.

In the modifications shown in FIGS. 14 to 22, the conductors 11, 11A, 11B of the bushings 1, 1A, 1B and the electrodes of the earth switches 4, 4A, 4B or the disconnecting switches 30, 30A, 30B are supported by a substantially columnar insulating member in place of the insulating spacer so as to make the apparatus simpler in construction.

Figure 14:
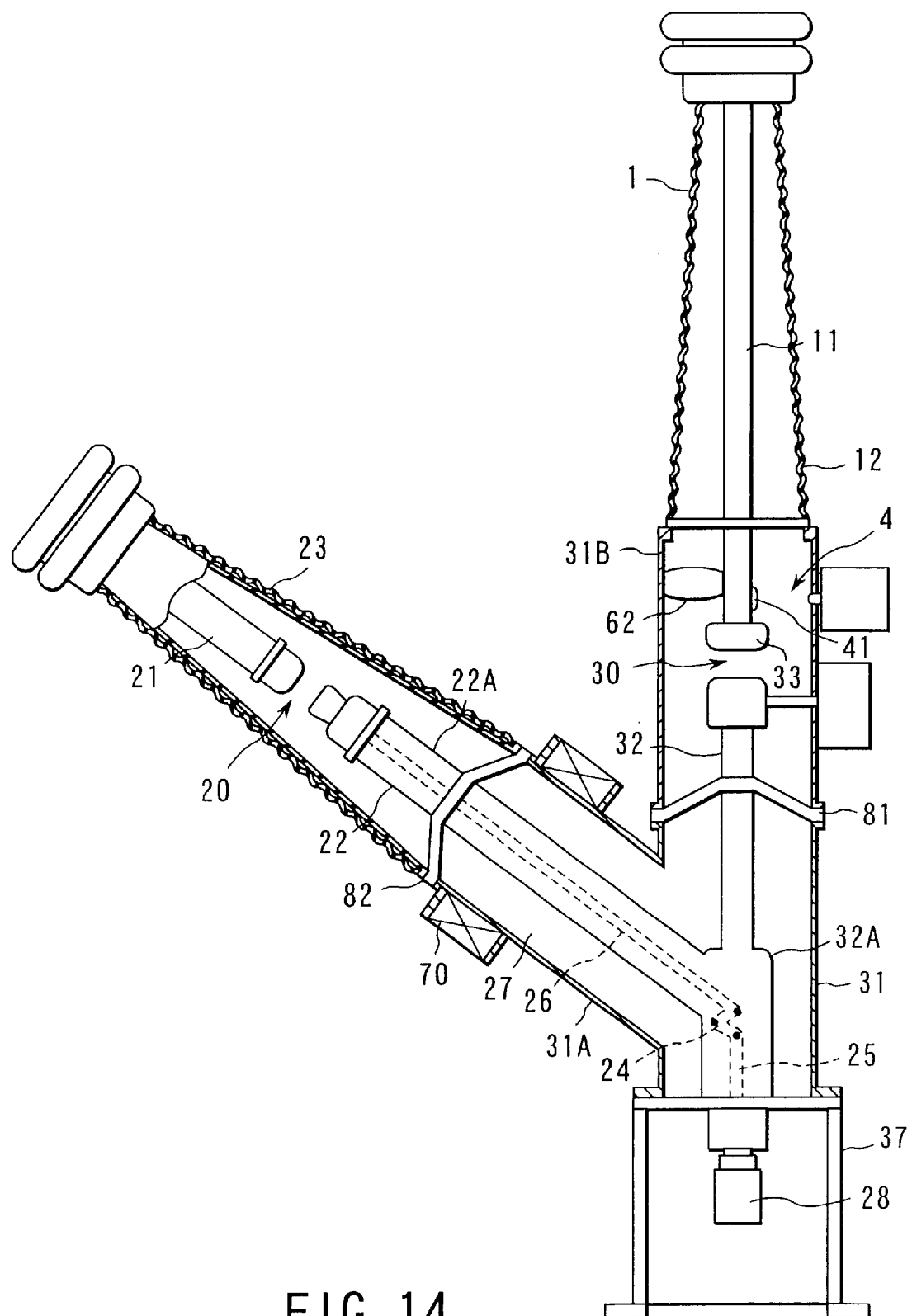
FIG. 14 is a cross sectional view schematically showing the construction of a hybrid type gas insulation switch gear apparatus according to a first modification of the present invention.
Figure 15:
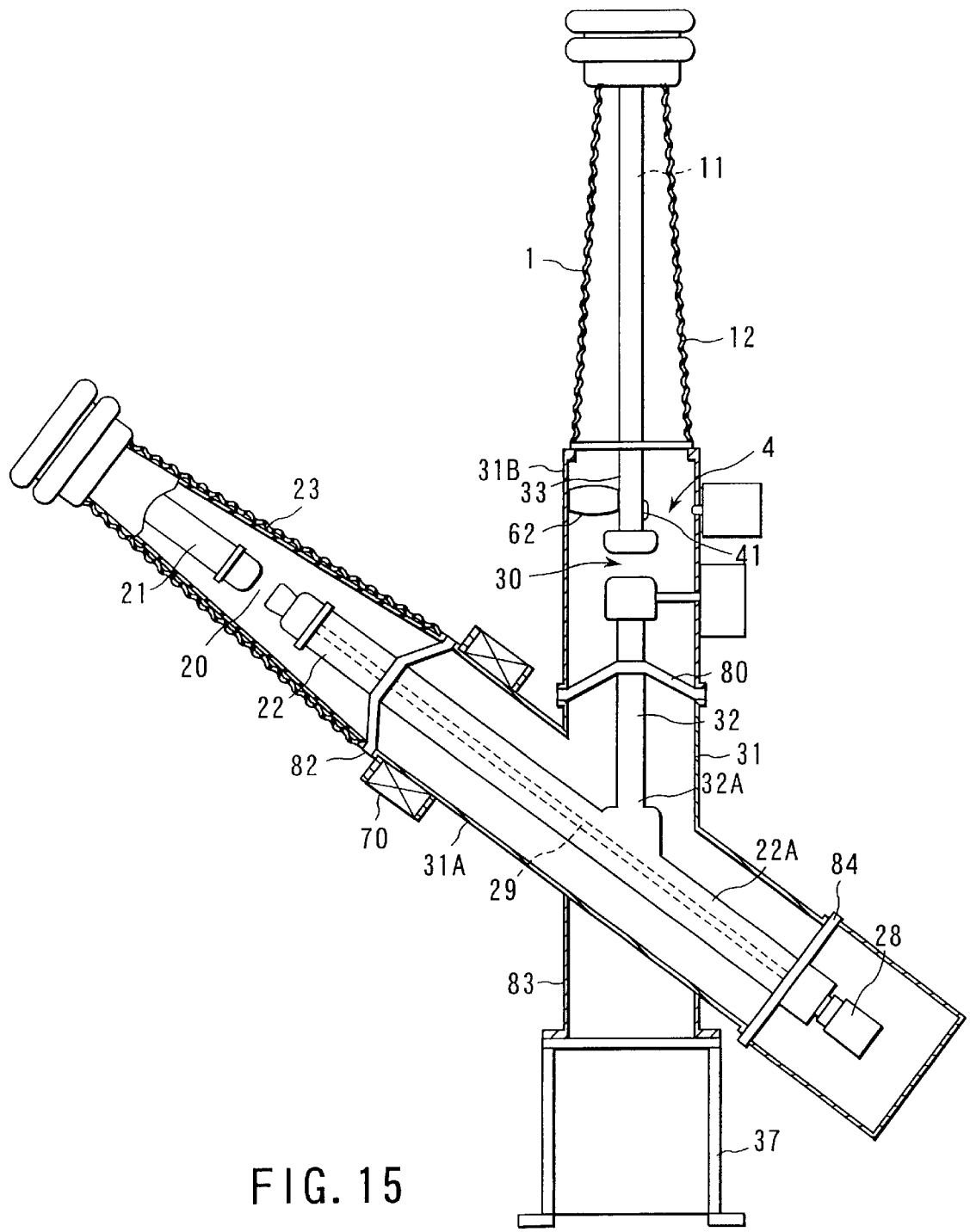
FIG. 15 is a cross sectional view schematically showing the construction of a hybrid type gas insulation switch gear apparatus according to a second modification of the present invention.
Figure 16:
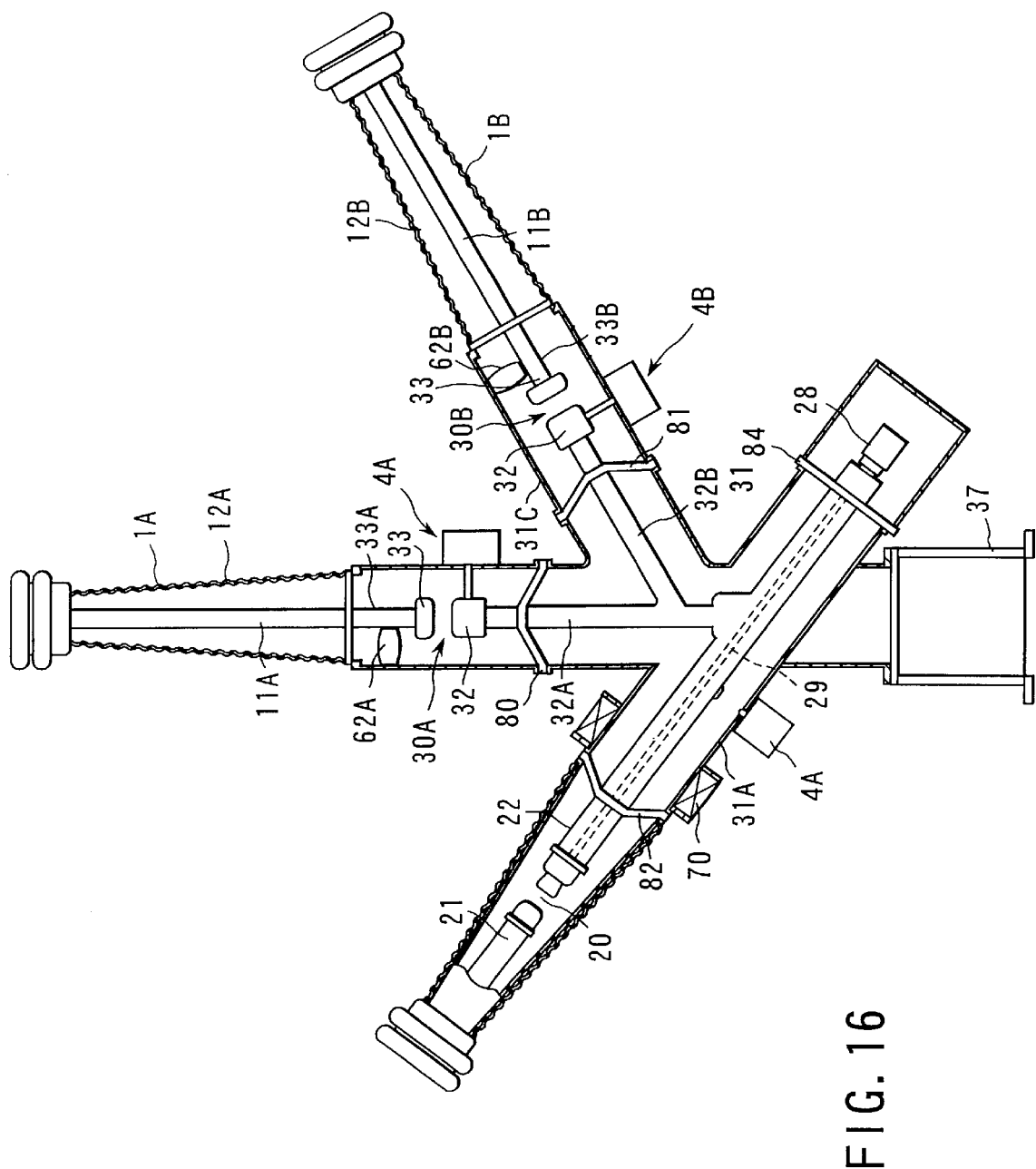
FIG. 16 is a cross sectional view schematically showing the construction of a hybrid type gas insulation switch gear apparatus according to a third modification of the present invention.
Figure 17:
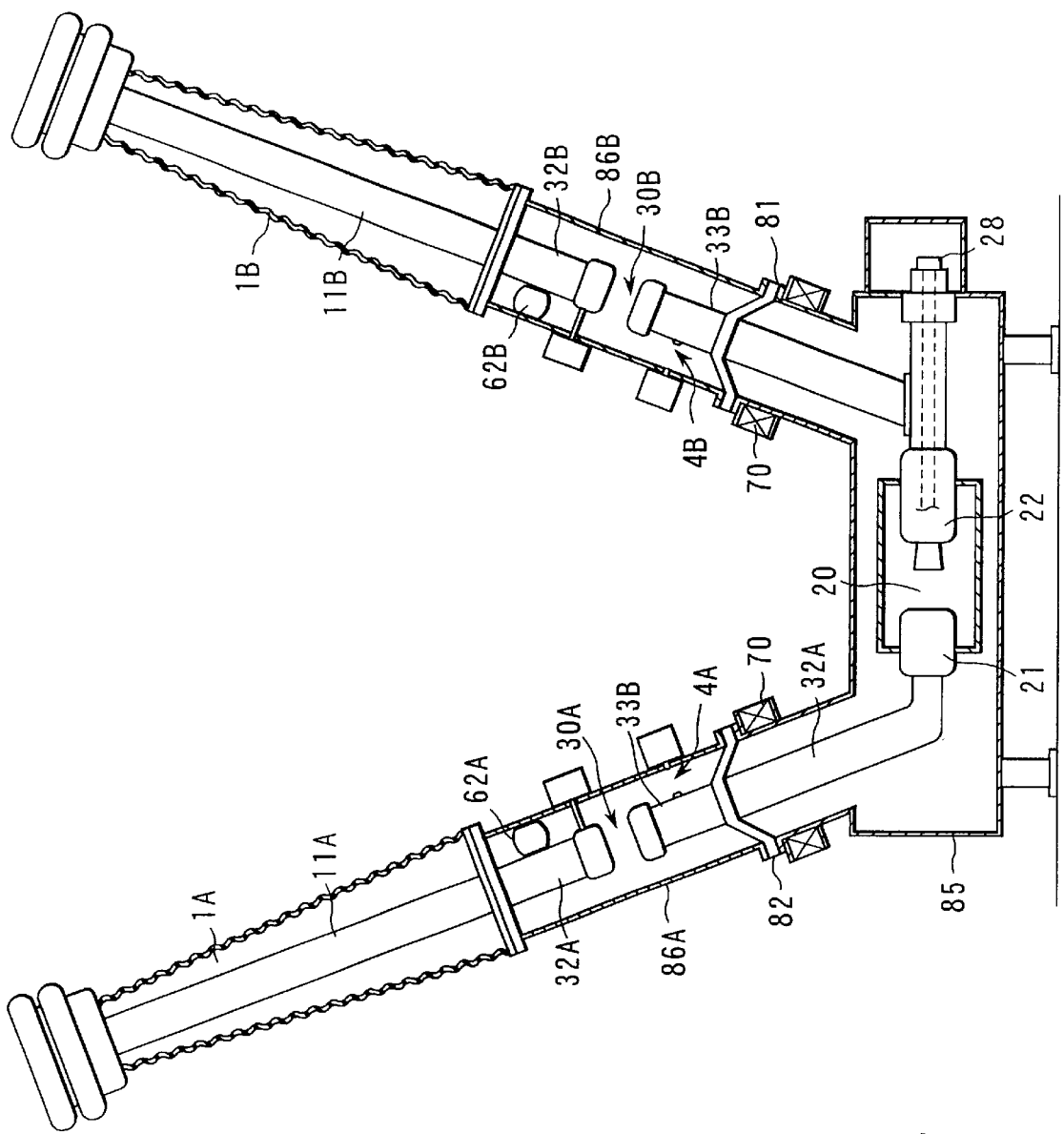
FIG. 17 is a cross sectional view schematically showing the construction of a hybrid type gas insulation switch gear apparatus according to a fourth modification of the present invention.
Figure 18:
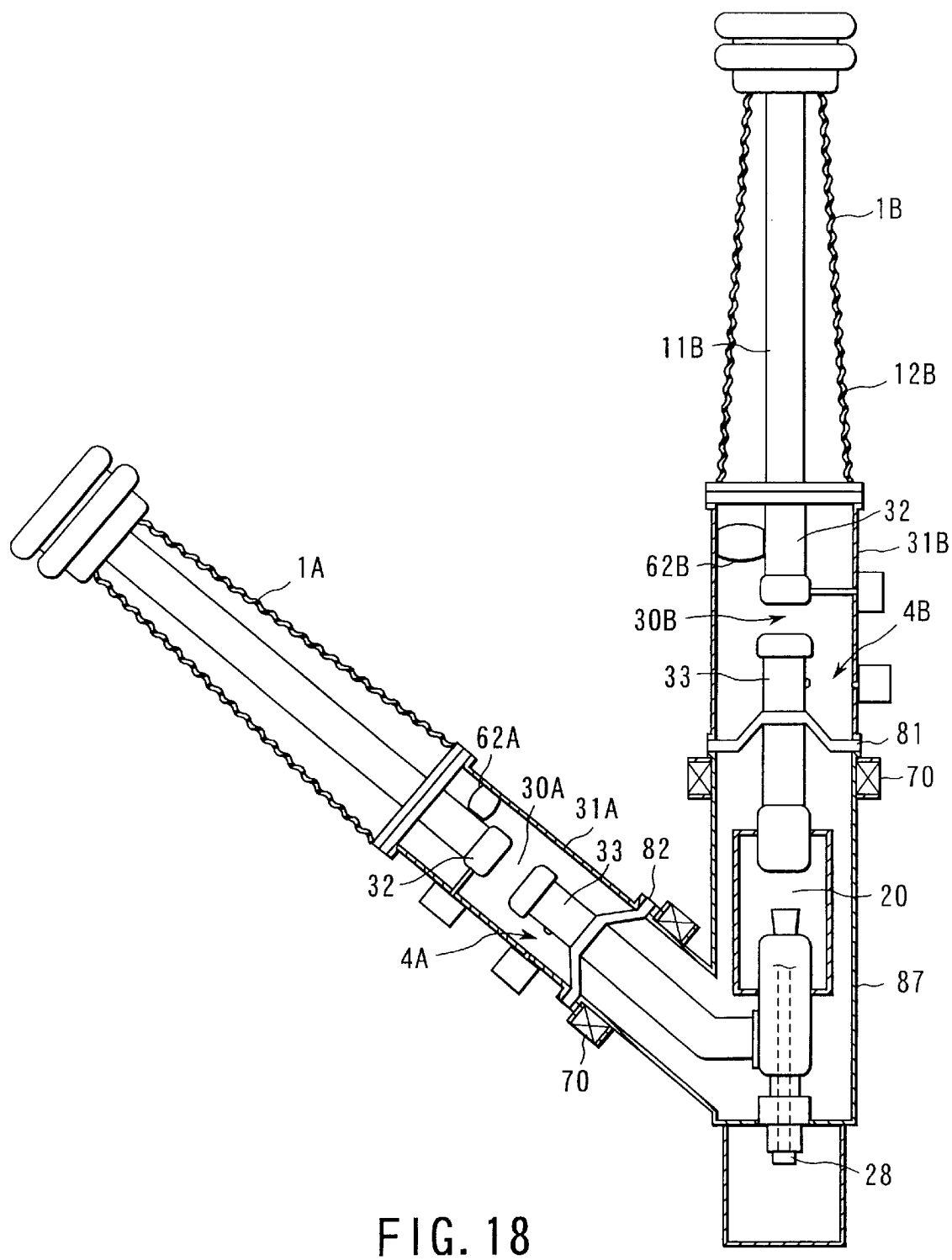
FIG. 18 is a cross sectional view schematically showing the construction of a hybrid type gas insulation switch gear apparatus according to a fifth modification of the present invention.
Figure 19:
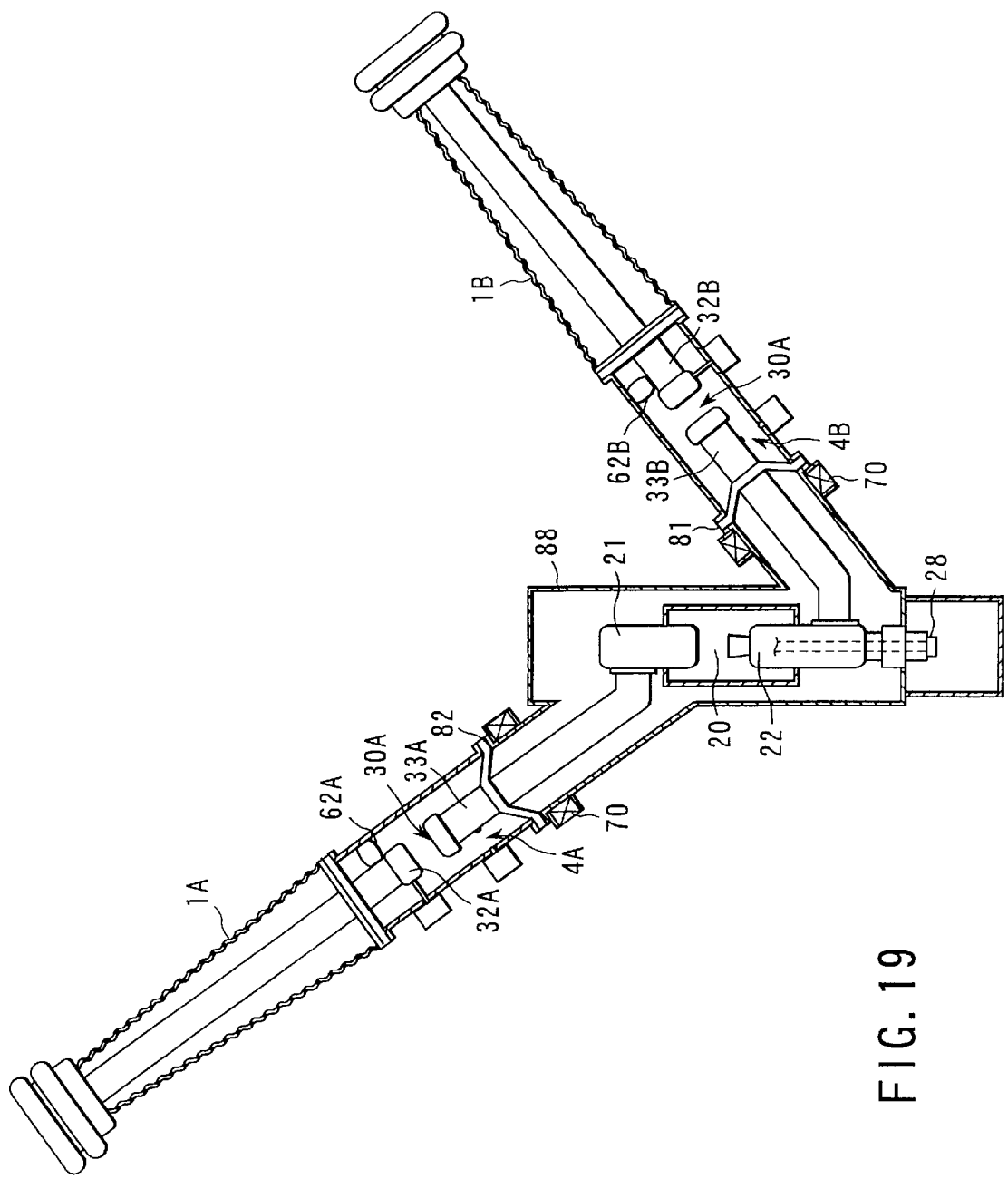
FIG. 19 is a cross sectional view schematically showing the construction of a hybrid type gas insulation switch gear apparatus according to a sixth modification of the present invention.

For example, in the apparatus shown in each of FIGS. 14 and 15, a substantially columnar insulating member 62 is used in place of the supporting member for supporting one electrode of the disconnecting switch 30 and the primary electrode 41 of the earth switch 4 in the apparatus according to each of the first and second embodiments. Also, in the apparatus shown in FIGS. 16, 17, 18 and 19, a substantially columnar insulating member 62A or 62B is used in place of the supporting member for supporting the movable electrodes 32A, 32B or the fixed electrodes 33A, 33B of the disconnecting switches 30A, 30B used in the apparatus according to the third, fourth, fifth and sixth embodiments of the present invention.

Figure 20:
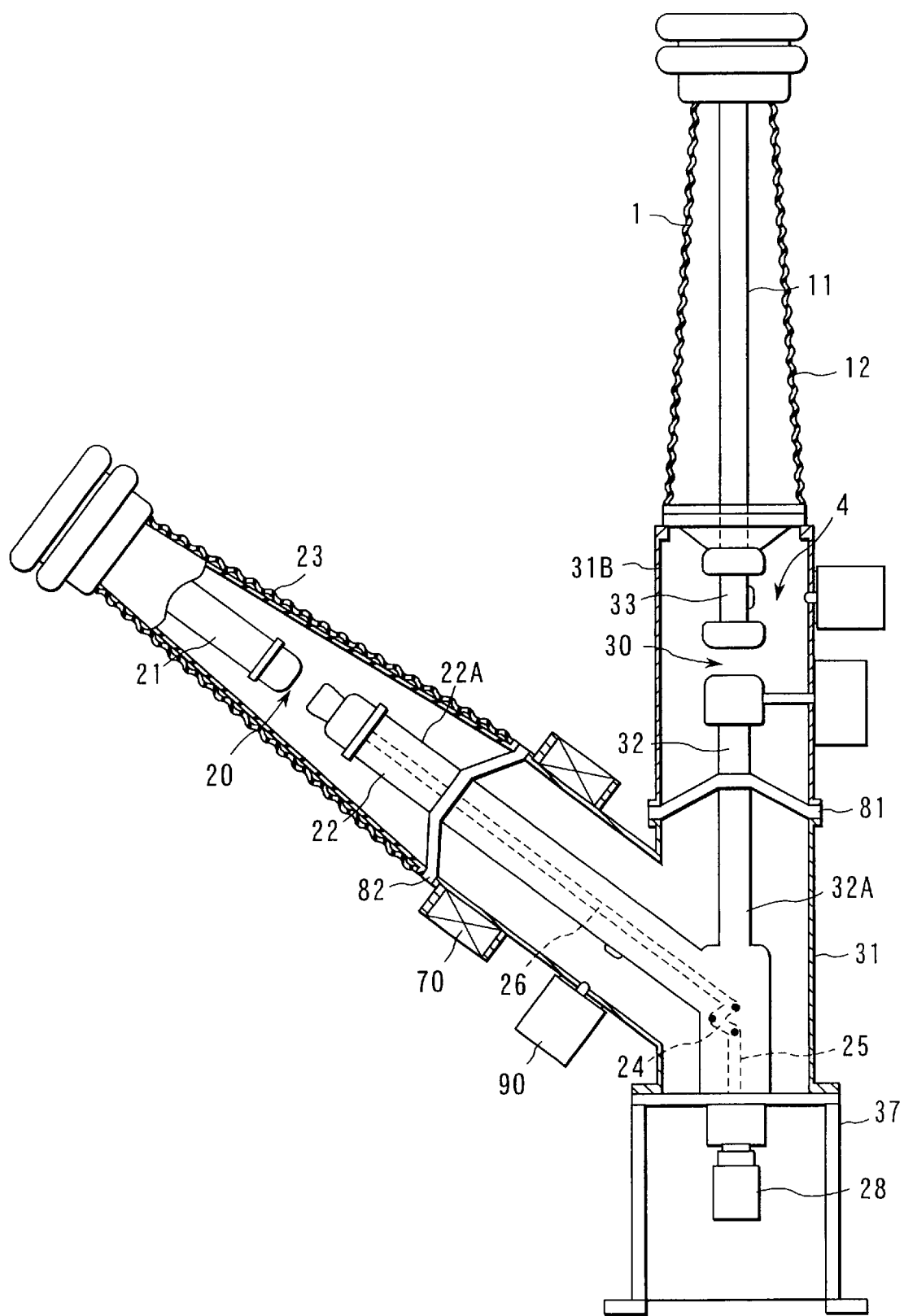
FIG. 20 is a cross sectional view schematically showing the construction of a hybrid type gas insulation switch gear apparatus according to a seventh modification of the present invention.
Figure 21:
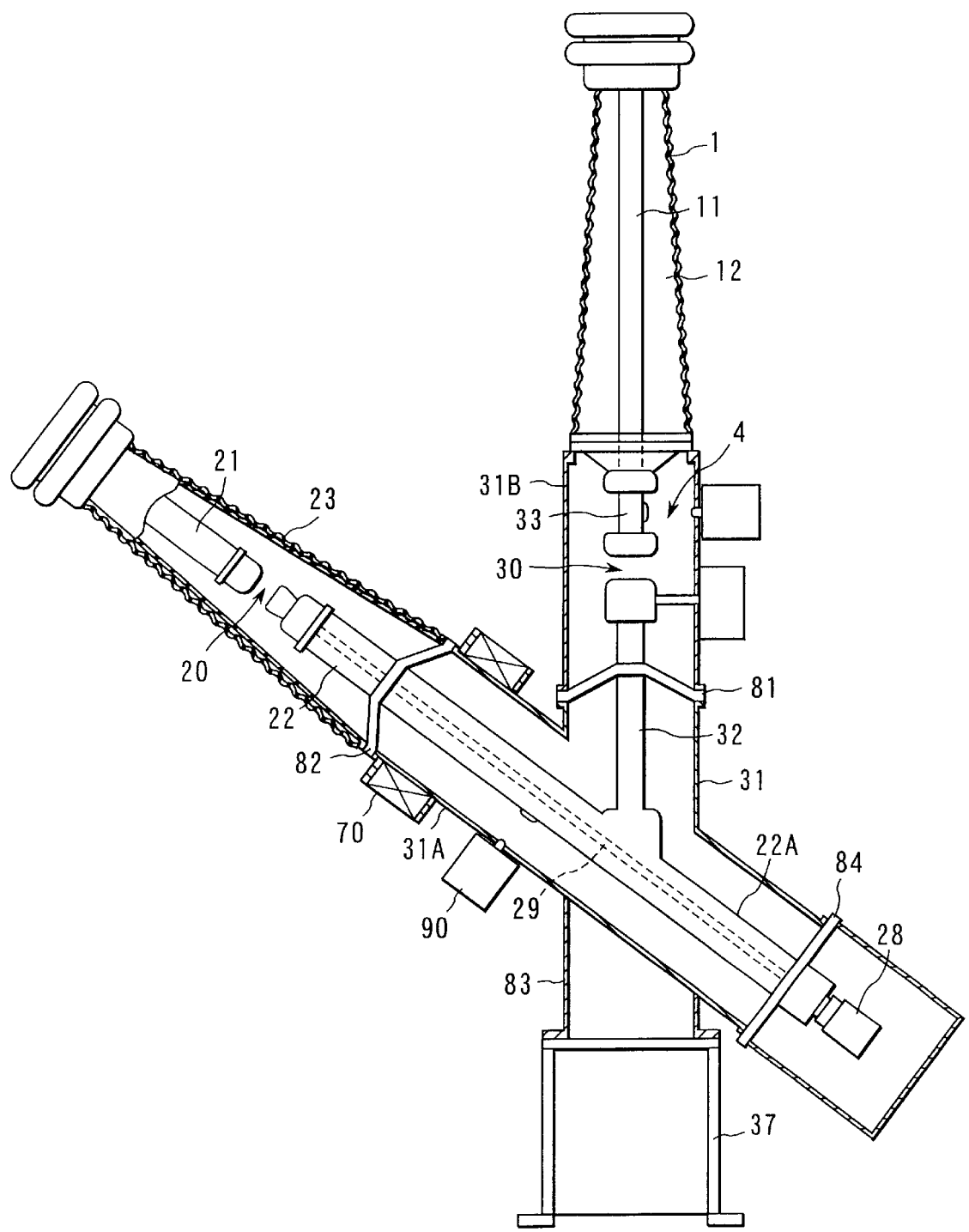
FIG. 21 is a cross sectional view schematically showing the construction of a hybrid type gas insulation switch gear apparatus according to an eighth modification of the present invention.

As shown in FIGS. 20 and 21, it is possible to arrange a second earth switch 90 between the circuit breaker 20 and the disconnecting switch 30 included in the apparatus according to each of the first and second embodiments of the present invention. In the case of arranging the second earth switch 90, the potential of the particular portions can be easily lowered to the ground potential in the inspecting stage so as to improve the safety.

Figure 22:
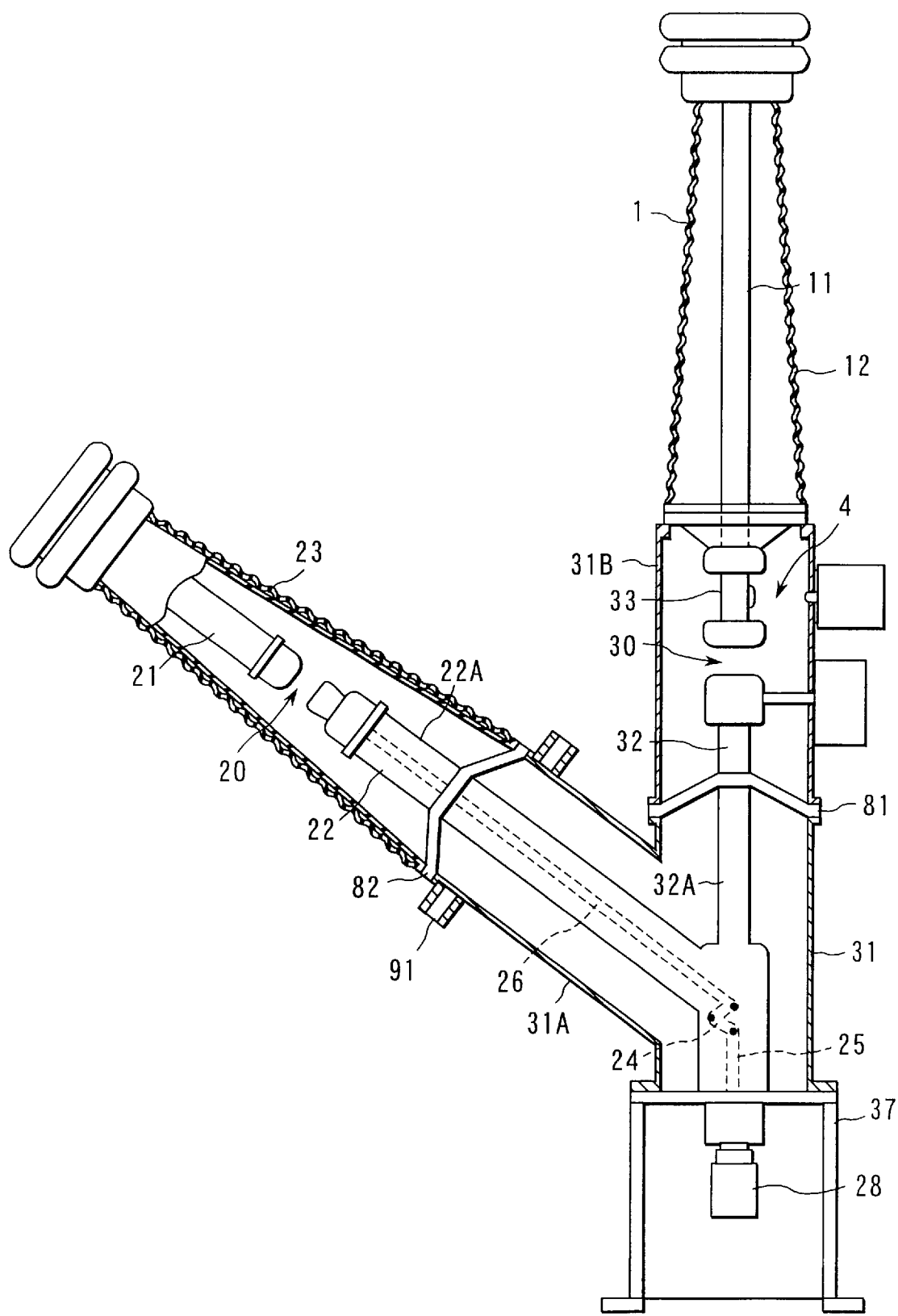
FIG. 22 is a circuit diagram schematically showing the construction of the hybrid type gas insulation switch gear apparatus according to a ninth modification of the present invention.
Figure 23:
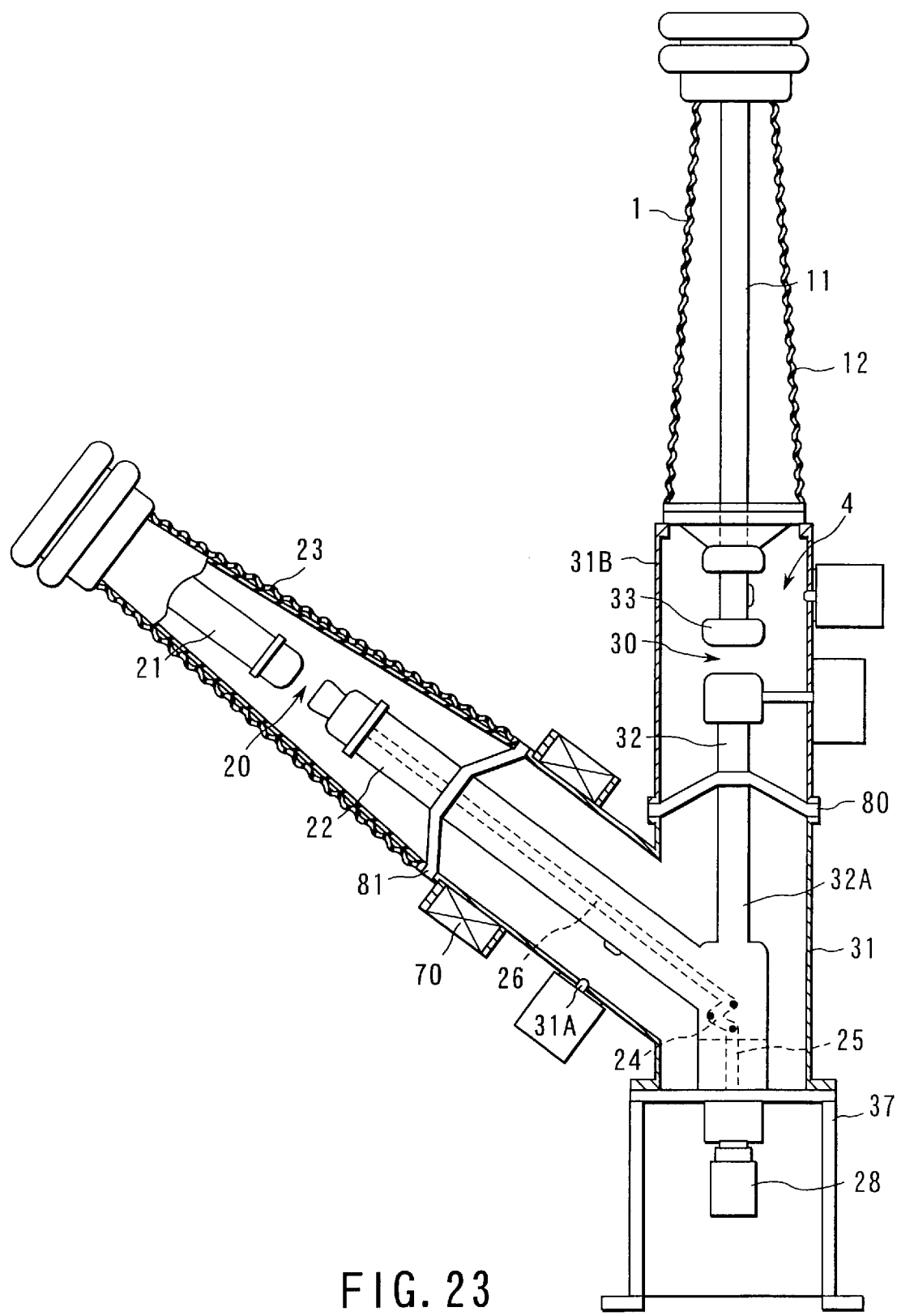
FIG. 23 is a cross sectional view schematically showing the construction of a hybrid type gas insulation switch gear apparatus according to a tenth modification of the present invention.

Further, it is possible to use a light transforming type current transformer 91 as shown in FIG. 22 in the apparatus according to each of the embodiments described previously so as to further decrease the weight and simplify the construction of the apparatus. Still further, a non-porcelain material can be used for forming the insulating enclosure 23 as shown in FIG. 23 in the apparatus according to each of the embodiments described previously so as to markedly lower the weight of the apparatus. The non-porcelain material is considered to include, for example, FRP (Fiberglass Reinforced Plastics) and rubber.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hybrid type gas insulation switch gear apparatus, comprising:

a main enclosure including a hollow base section and first and second cylindrical sections branched from the hollow base section, the first and second sections having first and second openings and first and second hollow spaces;

first and second bushings mounted on the first and second openings and including first and second hollow insulating housings having housing spaces and central conductors extended in the hollow insulating housings, respectively;

first and second insulating spacers provided in the first and second cylindrical sections and configured to separate the first and second hollow spaces into first and second segment spaces, respectively, such that the first segment spaces are partitioned from the hollow base section;

first and second fixed electrodes electrically connected to the first and second conductors and first and second movable electrodes which are received in the first segment spaces of the first and second cylindrical sections to form first and second disconnecting switches, respectively;

first and second insulating members configured to support the first and second movable electrodes on the first and second cylindrical sections, respectively;

a connecting conductor electrically connected to the first and second fixed electrodes of the first and second disconnecting switches, arranged in the first and second cylindrical sections and the hollow base section;

a main electrode provided in the hollow base section;

a second movable electrode provided in the hollow base section and configured to be moved to the main electrode and electrically connected to the main electrode and the connecting conductor to form a circuit breaker connected to the first and second disconnecting switch in series, respectively;

current transformers arranged around the first and second cylindrical sections to detect a current flowing through the connecting conductor; and first and second earth switches mounted to the first and second cylindrical sections in the first segment spaces, respectively, and including a movable counter electrode configured to connect and disconnect the first and second fixed electrodes of the disconnecting switch to the ground.

2. The hybrid type gas insulation switch gear apparatus according to claim 1, further comprising a driving mechanism configured to drive the second movable electrode of the circuit breaker, which is arranged in the connecting conductor.

3. The hybrid type gas insulation switch gear apparatus according to claim 1, wherein the insulating members have a substantially columnar shape, are fixed in the first and second cylindrical sections, and support the conductors of the first and second bushings, respectively.

4. The hybrid type gas insulation switch gear apparatus according to claim 1, wherein the current transformer is a light transforming current transformer.

5. The hybrid type gas insulation switch gear apparatus according to claim 1, wherein the hollow insulating housings are formed of porcelain.

6. The hybrid type gas insulation switch gear apparatus according to claim 1, wherein the hollow insulating housings is formed of a non-porcelain material.

* * * * *